(12) United States Patent
Au et al.

(10) Patent No.: US 9,357,228 B2
(45) Date of Patent: May 31, 2016

(54) MOTION ESTIMATION OF IMAGES

(75) Inventors: Oscar Chi Lim Au, Hong Kong (CN); Xing Wen, Hong Kong (CN); Jiang Xu, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 458 days.

(21) Appl. No.: 13/117,334

(22) Filed: May 27, 2011

(65) Prior Publication Data

US 2011/0293012 A1  Dec. 1, 2011

Related U.S. Application Data

(60) Provisional application No. 61/344,124, filed on May 27, 2010, provisional application No. 61/344,125, filed on May 27, 2010, provisional application No. 61/344,126, filed on May 27, 2010.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/57* | (2014.01) |
| *H04N 19/52* | (2014.01) |
| *H04N 19/433* | (2014.01) |
| *H04N 19/567* | (2014.01) |

(52) U.S. Cl.
CPC ............. *H04N 19/57* (2014.11); *H04N 19/433* (2014.11); *H04N 19/52* (2014.11); *H04N 19/567* (2014.11)

(58) Field of Classification Search
CPC ..... H04N 19/61; H04N 19/176; H04N 19/51; H04N 19/523; H04N 19/46; H04N 19/147; H04N 5/145; H04N 19/513; H04N 19/56
USPC .................................................... 375/240.16
See application file for complete search history.

(56) References Cited

U.S. PATENT DOCUMENTS

| | | | |
|---|---|---|---|
| 2004/0028133 A1* | 2/2004 | Subramaniyan et al. | 375/240.16 |
| 2006/0126741 A1* | 6/2006 | Saito et al. ............... | 375/240.16 |
| 2007/0153897 A1* | 7/2007 | Yan .......................... | 375/240.16 |
| 2008/0260033 A1* | 10/2008 | Austerlitz et al. ....... | 375/240.16 |

FOREIGN PATENT DOCUMENTS

| | | |
|---|---|---|
| CN | 1628465 A | 6/2005 |
| CN | 1997156 A | 7/2007 |

OTHER PUBLICATIONS

Kim, et al, "A Novel VLSI Architecture for Full-Search Variable Block-Size Motion Estimation". IEEE Transactions on Consumer Electronics, vol. 55, No. 2, May 2009. (c) 2009 IEEE. Last accessed Jul. 12, 2010, 6 pages.

Chen, et al., Analysis and Architecture Design of Variable Block-Size Motion Estimation for H. 264/AVC. IEEE Transactions on Circuits and Systems—I: Regular Papers, vol. 53, No. 2, Feb. 2006. (c) 2006 IEEE. Last accessed Oct. 6, 2009, 16 pages.

\* cited by examiner

*Primary Examiner* — Frederick Bailey
*Assistant Examiner* — Farhan Mahmud
(74) *Attorney, Agent, or Firm* — Amin, Turocy & Watson, LLP

(57) ABSTRACT

Provided is sub-block motion estimation that includes a full search with a reduced search area around a motion vector predictor. Also provided are a single (or unified) motion vector predictor and a function similar to a rate-distortion cost function. Also provided is a scanning order that can reduce or substantially eliminated redundant data loading and/or that can achieve different data re-use ratio. Further, provided herein is a reconfigurable multi-resolution motion vector reuse hardware architecture based on a single motion vector predictor and a function similar to a rate-distortion cost function. Further, through utilization of the disclosed aspects, only a small number of past motion vectors are propagated and the disclosed aspects can be reconfigured for video with different spatial resolution.

45 Claims, 11 Drawing Sheets

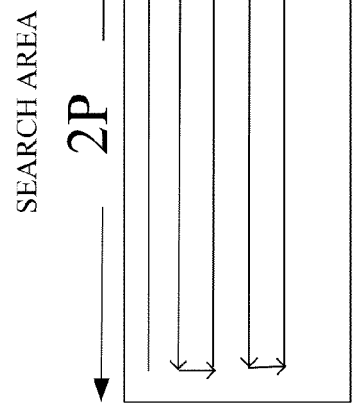
FIG. 6A
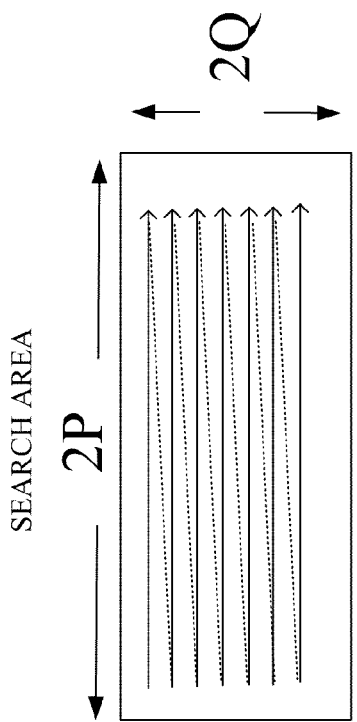
FIG. 6C
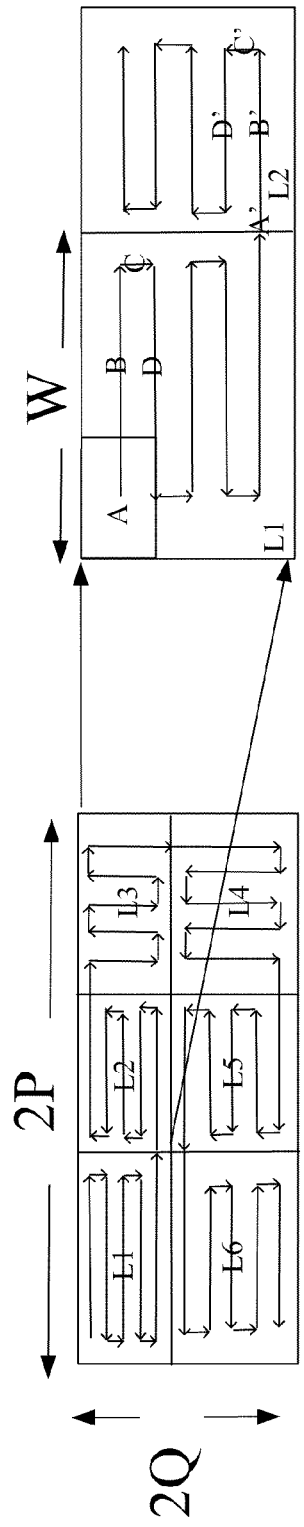
FIG. 6B
FIG. 6D

MOTION ESTIMATION OF IMAGES

PRIORITY CLAIM

This is an application claiming priority to Provisional Application No. 61/344,124 entitled "MULTI-RESOLUTION MOTION VECTOR RE-USE HARDWARE ARCHITECTURE" filed May 27, 2010; Provisional Application No. 61/344,125 entitled "RECONFIGURABLE SMART SNAKE SCAN WITH RRA" filed May 27, 2010; and Provisional Application No. 61/344,126 entitled "HARDWARE FRIENDLY VARIABLE BLOCK-SIZE MOTION ESTIMATION WITH UNIFIED MOTION VECTOR PREDICTOR AND RD-LIKE COST FUNCTION" filed May 27, 2010. The entireties of the aforementioned applications are incorporated by reference herein.

TECHNICAL FIELD

The subject disclosure relates to video processing and, more particularly, to motion estimation for video processing.

BACKGROUND

The transmission and storage of video are important for many applications and such usage has gained popularity worldwide. However, the size of raw video sequences can be quite large. For example, raw video data can be around 448 gigabytes for a high-definition movie. Further, raw video data can include redundant information, such as, for example, temporal domain redundancy, spatial domain redundancy, and/or statistical redundancy. Thus, video compression is utilized in order to reduce the size of raw video sequences.

Various video coding standards, such as (Moving Pictures Experts Group) MPEG-1/2/4 and (International Telecommunication Union (ITU) Telecommunication Standardization Sector) ITU-T H.261/263/264, have been developed in an attempt to achieve efficient compression of video sequences. For example, various video coding standards achieve compression by exploiting temporal redundancy using motion estimation and compensation. Some video coding standards employ spatial redundancy using discrete cosine transform. Other video coding standards employ statistical redundancy using entropy coding. Further video coding standards employ perceptual irrelevancy using quantization in an attempt to compress video sequences.

The various techniques for video compression, however, have a corresponding tradeoff, which is increased computational complexity and encoding time. For example, integer motion estimation can consume close to 60% of encoder time. In another example, if fractional motion estimation is utilized, it can consume close to 90% of encoder time.

The above-described deficiencies of today's video processing techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more aspects and corresponding disclosure thereof, various aspects are described in connection with a rate-distortion optimized (RDO) motion vector (MV) predictor-biased variable block-size (VBS) motion estimation algorithm, referred to as rate distortion (RD) optimized single motion vector predictor (MVP)-biased full search (RDOMFS) algorithm, with a matching reconfigurable architecture. In an aspect, the RDOMFS uses a single MVP (SMVP) and an RD cost function, which are easy to implement, to achieve substantially the same coding efficiency as FS-RD-var-mvp in H.264 reference software JM. In other aspects, the matching architecture, utilizes a 2-D systolic array to implement the proposed RDOMFS. The RDOMFS re-uses MVPs in a current frame to eliminate, or substantially eliminate, the need to store the MVs in the on-chip memory. Additionally, the RDOMFS uses a novel scanning order in the searching window to minimize redundant loading and can achieve different data re-use ratios.

These and other embodiments are described in more detail below.

BRIEF DESCRIPTION OF THE DRAWINGS

Various non-limiting embodiments are further described with reference to the accompanying drawings in which:

FIG. 6A illustrates a traditional raster scan;

FIG. 6B illustrates a traditional snake scan;

FIG. 6C illustrates a smart snake scanning order, according to an aspect;

FIG. 6D illustrates and enlargement of two sub-regions of FIG. 6C, according to an aspect;

DETAILED DESCRIPTION

Overview

Figure 1:
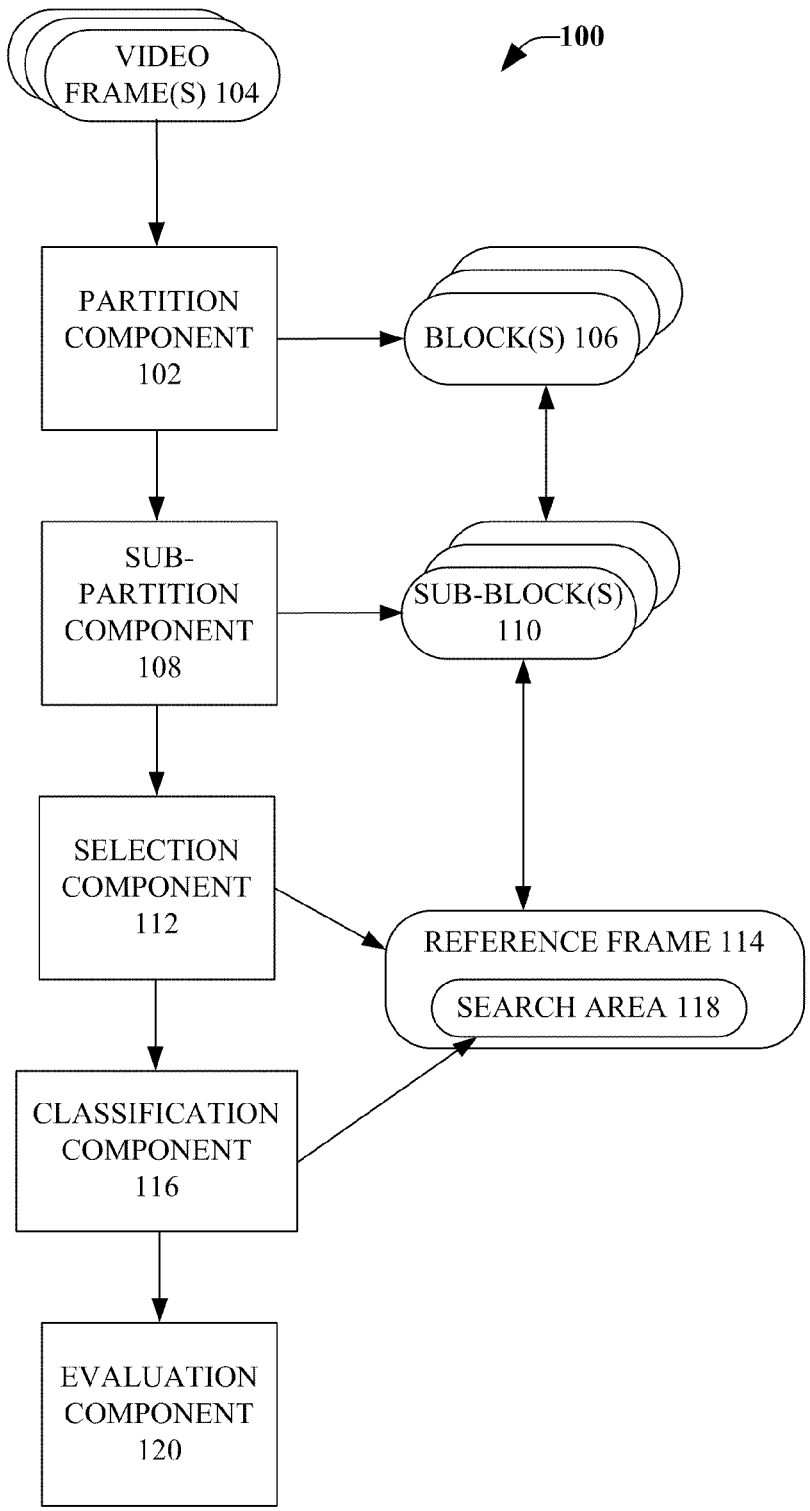
FIG. 1 illustrates a high-level block diagram of an exemplary system configured to provide video compression.

As mentioned above, many applications utilize the transmission and the storage of video and, thus, effective video compression is a growing concern. Conventional techniques for video compression exploit temporal redundancy using motion estimation and compensation, spatial redundancy using discrete cosine transform, statistical redundancy using entropy coding, and perceptual irrelevancy using quantization.

Motion estimation (ME) and motion compensation (MC) can effectively reduce temporal redundancy because there often exists a strong temporal correlation between temporally adjacent frames. By using a locally shifted version of the reference frame to construct a predicted frame and subtracting the predicted from a current frame, a resulting frame (referred to as a residue frame) tends to have much lower entropy than the original current frame and thus can be coded with improved rate-distortion performance.

However, the efficiency of ME has a tradeoff, which is increased computational complexity and encoding time. Motion estimation consists mainly of two parts: integer ME and fractional ME. According to a runtime profiling of a common software H.264 encoder (JM), the computational complexity of the integer ME (IME) can consume close to 60% of encoder time. When fractional ME is included, up to 90% of encoder time can be consumed.

Most of the existing ME techniques are based on Block Matching (BM). Typically, in BM, the current frame is divided into non-overlapping blocks, referred to as macroblocks (MB), each of size N×N (e.g., N=16). For each current MB in the current frame, a search window is defined around a reference point (e.g., the collocated point or some predicted location) in the reference frame (e.g. the previous frame). Without loss of generality, in this detailed description, it will be assumed the search range is [−P, P) in both the horizontal direction and the vertical direction. Each point in the search window is referred to as a search location, which corresponds to a candidate MB to predict the current MB. A distortion measure is defined to measure similarity between the candidate MB and the current MB. A search is performed within the search window for an appropriately-matched candidate MB with the most similarity. The displacement of the appropriately-matched MB from the current MB is referred to as the motion vector (MV).

Various measures are defined to determine the mismatch between the candidate blocks in the search window and the current MB, such as sum of squared difference (SSD) and sum of absolute transformed difference (SATD). Of course, smaller mismatch can be equivalent to higher similarity. However, the most commonly used mismatch measure is the sum of absolute difference (SAD) due to its simplicity and effectiveness.

$$SAD_{k,l}(m,n) = \sum_{i=0}^{N-1} \sum_{j=0}^{N-1} |X_t(k+i, l+j) - X_{t-1}(k+m+i, l+n+j)| \quad (1)$$

where (m, n) is the motion vector with −P ≤ m, n < P, $X_t(i,j)$ and $X_{t-1}(i,j)$ are the pixel values at location (i,j) in the current frame at time t and reference frame at time t−1, (k,l) is the location of the current block in the current frame, respectively. SAD computation can be consistent and suitable for efficient implementations. Further, conventional motion estimation architectures are based on SAD. Recently, another measure, Lagrangian rate-distortion (RD) cost function, has become increasingly popular. The general form of RD is:

$$RDCost = D + \lambda \cdot R \quad (2)$$

where D is the distortion such as SSD, SATD or SAD, R is the associated bit rate (e.g., of MV and/or of the residue), and λ is the Lagrangian multiplier.

In general, finding a MV with minimum mismatch might not find the appropriate MV because the MV itself may have significant bits to encode. For example, a MV with suboptimal mismatch might have few bits to encode. This can be the case for an H.264 encoder that spends a significant portion of bits on encoding the motion vectors. For example, in a H.264 encoder, a MV close to the median motion vector predictor (MVP) has fewer bits to encode than a MV that is far away. To achieve rate-distortion optimization, a cost function such as SAD or SSD is generally not suitable. Instead, the RD cost function of the Lagrangian rate-distortion cost function can allow enhanced solutions to be found. For example, the choice of λ allows a trade-off between the importance of the R term and the D term. An RD cost with a large λ tends to be dominated by R, such that MVs with small R tend to be chosen. On the other hand, an RD cost with a small λ tends to be dominated by D and MVs with small D tend to be selected. This RD cost function is often used in the software of state-of-the-art video coding standards such as H.264/AVC, for example, to achieve a quality rate-distortion performance. In H.264, λ is different for different quantization parameters Qp and there can be around 51 possible values for Qp. When the RD cost function is used, the motion estimation is referred to as rate-distortion optimized or RDO. However, it can be difficult to implement the RD cost function in hardware because the RD cost function computation uses floating-point multiplication and/or the cost for the lookup table can be expensive.

A common motion estimation technique is the full-search block-matching algorithm (FS), which examines all the search points in the search window in a brute-force manner. FS is zero-biased, which means that the center of its search window in the reference frame is the same, or substantially the same, as the location of the current MB. An FS examines all the points in the search area, and, therefore, can achieve global minimum mismatch and thus good visual quality. FS has a huge computation load in software implementations, however, FS can be efficiently implemented by hardware to achieve good data throughput because its dataflow is regular and is suitable for pipelining. Also, data re-use can be explored between neighboring search locations because their reference pixel regions are overlapping.

Besides FS, many fast motion estimation (FME) algorithms have been developed to avoid the high computation load of FS. Most FMEs perform some search around a search center. The search center may be zero-biased or MVP-biased. The zero-biased search center is the (0, 0) motion vector. Some common zero-biased FME include NTSS (New Three Step Search), Diamond search, FTS (Flexible Triangle Search), and Cross search. An MVP-biased search center is chosen from a number of MVPs according to certain criteria. The MVPs are typically obtained by using MVs of spatially and temporally neighboring blocks. Further, the MVP-biased search center may or may not be the (0, 0) motion vector. Some common MVP-biased FME include PMVFAST (Predictive Motion Vector Field Adaptive Search Technique), UMHexagonS, and EPZS (Efficient Predictive Zonal Algorithm). Often, some local search is performed around the search center in the FMEs. In that case, the final MV can only achieve local minimum mismatch (as opposed to global minimum achieved by FS). Often such local minimum mismatch would lead to lower visual quality than FS. However, a MVP-biased FME tends to achieve higher visual quality than a zero-biased FME, because its MVP-biased search center tends to be closer to the global minimum point in FS than the zero-biased search center. At times, the rate-distortion performance of many MVP-biased FMEs are substantially the same as FS. This is probably the reason why MVP-biased FMEs are used in the MPEG-4 and H.264 reference software. Another desirable feature of MVP-biased search center is that it tends to provide smoother motion field than zero-biased search center, more closely resembling the actual situation. However, it is often difficult to implement MVP-biased motion estimation algorithms by hardware because the consideration of multiple MVPs and the often irregular local search patterns can easily break the hardware pipeline leading to lower hardware efficiency, lower data re-use and more memory access.

Early video coding standards such as MPEG-1, MPEG-2, H.263, and MPEG-4 tend to use a 16×16 macroblock as a basic coding unit and perform fixed block-sized (FBS) motion estimation. On the other hand, the latest H.264 allows a 16×16 MB to be partitioned into different kinds of sub-blocks each with its own motion vector and performs variable block-size (VBS) motion estimation for all possible sub-blocks. For example, the 16×16 MB can be partitioned into sub-blocks of size 16×16, 16×8, 8×16, 8×8, 8×4, 4×8, and 4×4. VBS ME allows different MVs for different sub-blocks and thus can achieve improved matching for all sub-blocks than FBS ME. With improved prediction, VBS ME can be used in H.264 to achieve high coding efficiency. VBS can be useful for MBs containing multiple objects, each with possibly different motion. VBS can also be useful for MBs with rotation and even deformation. While VBS ME has good rate-distortion performance compared with FBS ME, VBS has huge computational demands and irregular memory access, which can make it difficult for efficient hardware implementation.

While early ME algorithms tend to use SAD as the mismatch measure due to its complexity, recent ME algorithms tend to use RD cost function due to its RD performance. In this detailed description, "-SAD" and "-RD" are used to distinguish two different versions of any algorithm: the one using SAD as mismatch measure and the one using RD cost function respectively. For example, FS-SAD is FS using SAD and FS-RD is FS with RD cost function. Similarly, in this detailed description, "-zero" and "-mvp" are used indicate the zero-biased version and the MVP-biased version respectively. Further, in this detailed description, "-var" and "-fix" are used to indicate VBS and FBS respectively. For example, FS-SAD-fix-zero is zero-biased FBS FS using SAD as mismatch measure, and FS-RD-var-mvp is MVP-biased VBS FS using RD mismatch measure.

Over the years, many ME architectures have been proposed. Among these, some are for some FME, but most of them are for FS. Among those for FS, some are MVP-biased and some use RD distortion measure, but most of them are for zero-biased FS using SAD as distortion measure (e.g., FS-SAD-zero). While early ME architectures tend to perform FBS ME, newer architectures are mostly for VBS ME.

Some ME architectures include a one-dimensional (1-D) systolic array architecture with 16 processing elements (PE) for full-search VBSME (FSVBSME). Another ME architecture is a three 2-D systolic array architectures with 256 PEs for FS-SAD-var-zero, which has lower RD performance than the FS-RD-var-mvp in the H.264 JM reference software. A few other ME architectures use FS-RD-var-mvp, however, such architectures utilize a significant amount of extra on-chip memory to store all the MVs used to generate the MVPs. Further, the noted ME architectures can incur redundant loading inside the search window leading to huge latency and considerable power consumption. As used in this detailed description, the term "redundant loading" refers to data being loaded more than once.

Thus, it would be beneficial to provide a more efficient rate-distortion optimized (RDO) motion estimation in order to exploit temporal redundancy to achieve good rate-distortion (RD) performance, real-time implementation with high data throughput, regular data flow, good parallelism, and a high degree of memory re-use. Further, it would be beneficial to provide a more efficient IME for real-time video coding. It would also be beneficial to provide a more efficient VBS motion estimation.

An aspect relates to a method that includes dividing one or more video frames into a plurality of sub-blocks created from a plurality of blocks and identifying a reference frame within the one or more video frames. The method also includes defining a search area for the plurality of sub-blocks as a function of a plurality of motion vector predictors (MVPs) including centering the search area around a location defined in the reference frame. Further, the method includes searching for at least one sub-block of the plurality of sub-blocks, including identifying a rate-distortion (RD) cost and choosing a corresponding motion vector based on the RD cost as a motion vector (MV) of the at least one sub-block.

In an implementation, identifying the RD cost comprises identifying a RD cost that comprises a first additive element that is a distortion measure between a current sub-block and a candidate reference sub-block and identifying a second additive element that is a product of lambda, being a function of at least one of a sub-block size and location, a block location and type, a quantization parameter, a target rate behavior, a buffer condition or a buffer property, and a function of a difference between a candidate MV and a MVP. Further to this implementation, identifying the second additive element comprises identifying the second additive element as a function of motion vectors of neighboring blocks or sub-blocks.

In another implementation, the method includes determining the plurality of MVPs as a function of a plurality of MVs of neighboring blocks or neighboring sub-blocks, and wherein the defining the search area comprises identifying a search center as a function of the plurality of MVPs. Further to this implementation, the method includes assigning one MVP from the plurality of MVPs as a median of a block motion vector on a left block, a top block, and a top-right block.

In a further implementation, defining the search area comprises identifying a search center as a median of motion vectors of three past neighboring blocks that include a first block at a left position, a second block at a top position, and a third block at a top-right position. Further to this implementation, the method includes identifying at least one alternative block in response to one of the first block, the second block, or the third block not being available. In an aspect, identifying the at least one alternative block comprises choosing a fourth block at a top-left position.

Another aspect relates to a system that includes a partition component configured to divide a video frame into a plurality of blocks and a sub-partition component configured to divide the plurality of blocks into a plurality of sub-blocks. The system also includes a selection component configured to choose a reference frame from the plurality of sub-blocks and a classification component configured to define a search area comprising a search center. The search area is based on a plurality of motion vector predictors (MVPs). Further, the system includes an evaluation component configured to calculate a rate-distortion (RD) cost function for selected search points in the search area to choose a motion vector (MV) for the plurality of sub-blocks.

In an implementation, the RD cost function comprises a first element and a second element, wherein the first element is a distortion measure and the second element is a product of a parameter and a function of a difference between a candidate MV and a MVP of the plurality of MVPs. Further to this implementation, the parameter is lambda, which is a function of a sub-block size and location, a block location and type, a quantization parameter, a target rate behavior, a buffer condition and a buffer property. In an aspect, the parameter is lambda and lambda is approximated by a linear combination of a power-of-2.

In an aspect, the MVP of the second element is a function of motion vectors of past neighboring blocks. In another aspect, the MVP of the second element is a function of motion vectors of past neighboring blocks on the left, top, and top right in relation to a current block. In yet another aspect, the MVP of the second element is a median of motion vectors of past neighboring blocks on the left, top, and top right in relation to a current block.

In an implementation, the search area corresponds to a candidate motion vector between a current block or current sub-block and a candidate reference block or candidate sub-block of a similar size in the reference frame. In some implementations, the search center is the MVP.

In some implementations, the search center is a median of identified motion vectors of three past neighboring blocks. Further to this implementation, the three past neighboring blocks include a left block, a top block, and a top-right block in relation to a current block.

Another aspect relates to a method that includes identifying a reference frame from a plurality of video frames and defining a search area comprising a plurality of search points in the reference frame, the search area comprises a plurality of search points. The method also includes dividing the search area into sub-windows and processing the plurality of video frames including establishing a scanning order among the sub-windows and the sub-window can be scanned at least once and two adjacent sub-windows are spatially close.

In an implementation, scanning the sub-windows comprises performing a horizontal scan, a vertical scan, or both the horizontal scan and the vertical scan. In some implementations, the method further comprises before the defining, dividing the video frames into blocks that comprise N×N pixels; and wherein the processing comprises reading N pixels in parallel in one clock cycle and loading the pixels once within the sub-window. In a further implementation, scanning the sub-windows comprises scanning with at least one snake scan chosen from sixteen different snake scans.

In some implementations, scanning the sub-windows further includes scanning a first sub-window with a first type of snake scan, moving to an adjacent search point in a second sub-window, and scanning the second sub-window with a second type of snake scan.

In another implementation, dividing the search area into the sub-windows comprises dividing the search area into non-overlapping rectangular sub-windows. In an implementation, scanning the sub-windows comprises defining a scanning order using a scan that starts from an upper-left corner, an upper-right corner, a lower-left corner, or a lower-right corner of a search window, and wherein the scan is a horizontal scan or a vertical scan. In some implementations, scanning the sub-windows comprises dividing the search area into regions and applying a snake scan locally in the regions.

A further aspect relates to a system that includes a selection component configured to identify a reference frame and a designation component configured to define a search area in the reference frame. The system also includes a sub-partition component configured to divide the search area into a plurality of sub-windows and a scan component configured to select a scanning order among sub-windows, the sub-windows can be scanned at least once and two adjacent sub-windows in the scanning order are spatially close.

In an implementation, the scan component is configured to perform a horizontal scan, a vertical scan, or both the horizontal scan and the vertical scan on the plurality of sub-windows. In some implementations, the scan component is configured to perform a horizontal scan in which a first row is scanned horizontally in a first direction and a second row is scanned horizontally in a second direction. In a further implementation, the scan component is configured to perform a vertical scan in which a first row is scanned vertically in a first direction and a second row is scanned vertically in a second direction. According to another implementation, the scan component is configured to select a scanning order that includes a snake scan that starts in a upper-left corner, an upper-right corner, a lower-left corner, or a lower-right corner of the search area, wherein the snake scan uses a horizontal scan or a vertical scan.

In some implementations, a plurality of points in the search area correspond to a candidate motion vector between a current block and a candidate reference block of a similar size in the reference frame.

In a further implementation, the sub-partition component is configured to divide the search area into rectangular sub-windows, and wherein a plurality of search points in the search area belong to the plurality of sub-windows.

In some implementations, the system includes a data bus configured to read N pixels in parallel in one clock cycle, wherein a block of the reference frame comprises N×N pixels. The system also includes a reconfigurable register array configured to store data in a row for use in a next row, wherein the N pixels can be loaded once within the plurality of sub-windows.

In other implementations, the scan component is configured to select a scanning order from sixteen different snake scans, wherein a first set of the snake scans are for vertical scan and a second set of the snake scans are for horizontal scan. In yet another implementation, the scan component is configured to select a scanning order that divides the search area into regions and a snake scan is applied locally in the regions.

Another aspect relates to a method that includes identifying a plurality of reference frames from a set of video frames and obtaining, from the plurality of reference frames, a first motion vector predictor (MVP) and a second MVP. The method also includes defining a search area in the plurality of reference frames, the search area is centered around the first MVP or the second MVP. Further, the method includes performing motion estimation for sub-blocks based on the first MVP and the second MVP and selecting a motion vector from the sub-blocks in the plurality of reference frames.

In an implementation, obtaining the first MVP and second MVP comprises obtaining the first MVP and the second MVP based on motion vectors of past blocks. In some implementations, obtaining the first MVP or obtaining the second MVP includes obtaining a median of the motion vector of a left block, the median of the motion vector of a top block, or the median of the motion vector of a top-right block in relation to a current block.

In some implementations, performing motion estimation comprises performing a single MVP that uses only one of the first MVP or the second MVP.

In some aspects, the method includes performing a location full search motion estimation around the first MVP or the second MVP. Further to this aspect, performing motion estimation comprises computing a cost function that includes multiple additive terms including a distortion term and a term that is a product of a lambda parameter, being a function of at least one of a sub-block size and location, a block location and type, a quantization parameter, a target rate behavior, a buffer condition or a buffer property, and a rate function of encoding the motion vector.

Herein, an overview of some of the embodiments for video processing and motion estimation of images has been presented above. As a roadmap for what follows next, various exemplary, non-limiting embodiments and features for motion estimation of images are described in more detail. Then, some non-limiting implementations and examples are given for additional illustration.

Motion Estimation of Images

By way of further description with respect to one or more non-limiting ways to provide compression of images and/or motion estimation of images, FIG. 1 illustrates a high-level block diagram of an exemplary system configured to provide video compression. Included in the video processing system 100 is a partition component 102 configured to divide one or more video frames 104 into a multitude of blocks 106. In some implementations, system 100 can include a sub-partition module 108 that is configured to sub-divide at least one of the blocks 106 into two or more sub-blocks 110. According to some aspects, the partition component 102 is configured to divide at least one of the blocks 106 into the two or more sub-blocks 110. In some aspects, at least one of the blocks 106 (sometimes referred to as a "current block") can be sub-divided into many current sub-blocks (e.g., sub-blocks 110). The sub-blocks 110 can have different sizes and/or different shapes.

Also included in system 100 is a selection component 112 configured to identify a second frame as a reference frame 114. A classification component 116 is configured to define a search area 118 for at least one of the sub-blocks 110. In some aspects, the search area 118 is centered around a location, referred to as the search center in the reference frame 114.

One or more points in the search area 118 (referred to as "search point") can correspond to a candidate motion vector (MV) between the current block (or current sub-block) and a candidate reference block (or candidate sub-block) of a similar size (or of the same size) in the reference frame 114.

In some aspects, the search center is a function of a number of motion vector predictors (MVPs). One or more MVPs can be a function of the motion vectors of neighboring blocks or sub-blocks. For example, one MVP can be the median of the block motion vector on the left, top, and top-right (referred to as SMVP (Single Motion Vector Predictor)).

An evaluation component 120 is configured to perform a search, for one or more current sub-blocks, by computing the RD cost function for selected search points in the search area. A search point with a RD cost can be identified and the corresponding motion vector can be chosen as the MV of the sub-block.

In some aspects, the RD cost function includes more than one element. For example, a first element in the RD cost can be an additive element, which is a distortion measure between the current sub-block and the candidate reference sub-block. A second element in the RD cost can be an additive element, which can be a product of a parameter (called lambda) and a function of the difference between the candidate MV and a MVP. In some aspects, the MVP in the second element of the RD cost can be a function of the motion vectors of neighboring blocks or sub-blocks (single MVP). In some aspects, for all (or substantially all) sub-blocks in the current block, the same (or a similar) MVP (e.g., unified) is utilized.

As discussed, system 100 (and related aspects), also referred to as an RD Optimized single-MVP-biased FS (RDOMFS), uses a single-MVP bias and a RD cost function.

In accordance with some aspects, the RDOMFS can achieve similar RD performance as FS-RD-var-mvp (default motion estimation algorithm in H.264 JM software) and can achieve more enhanced performance than FS-SAD-var-zero.

For example, some FME methods are used in the latest H.264 standard JM software to achieve good RD performance and low computational complexity. Many of these FME methods are MVP-biased in the sense that they perform some kind of local search such as small diamond search or hexagonal search around a search center, which is chosen from a few MVPs. Typically, the FME methods compute the similarity measure or cost function for a few highly probable MVPs, select one as the suitable MVP, and use the selected MVP as the center for the local search for a motion vector with minimum mismatch. A local search can yield a local minimum, which may or may not be the global minimum. The use of multiple MVPs to find the search center as opposed to a single MVP helps to increase the probability that the local minimum is the global minimum.

Figure 2A:
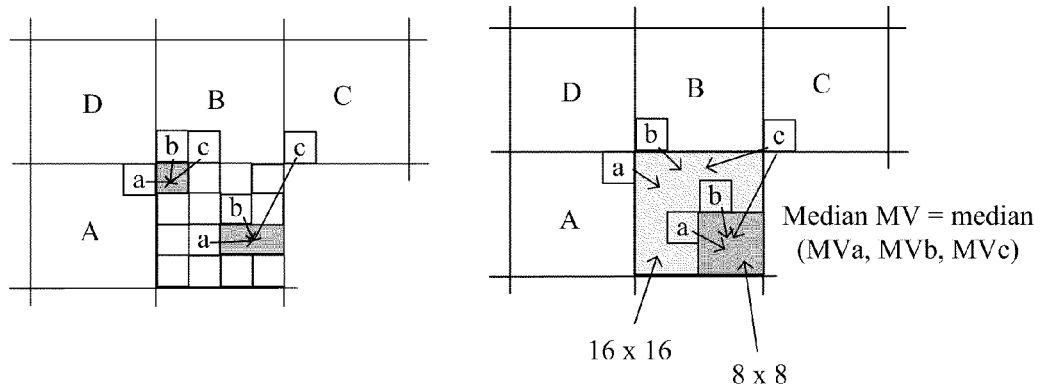
FIG. 2A illustrates median MVP definition in H.264 for various block sizes.

Typically, the MVPs used in these FME include temporally and spatially neighboring MVs. The temporally neighboring MV is the MV of the collocated block in the reference frame, which includes the storage of the MV of the reference frames. The spatially neighboring MVs include the MVs of the left, top, and top-right sub-blocks. Functions of these three MVs can also be used. An example is the median. Note that in H.264, the definition of the left, top, and top-right sub-blocks can be different for different sub-block sizes and can be different for sub-blocks of the same, or substantially the same, size at different locations. Thus, a large amount of memory is consumed to store the MVs for sub-blocks of all sizes. Some examples are shown in FIG. 2A for sub-block size of 4 and 16. In addition, the data flow to compute the median is also irregular.

Figure 2B:
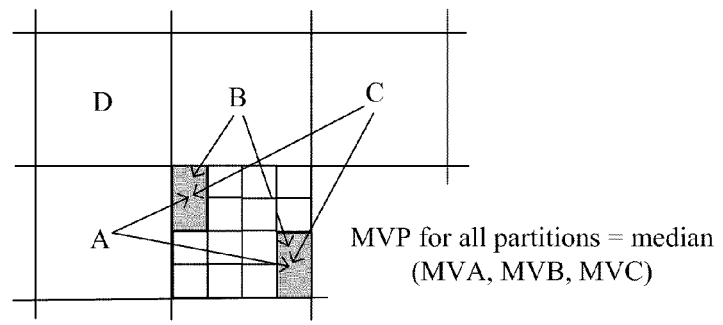
FIG. 2B illustrates a unified SMVP for all sub-blocks, according to an aspect.

In particular, the use of multiple MVPs can tend to be inefficient for hardware implementation for a number of reasons. For example, the spatially varying definitions of left, top, and top-right sub-blocks, as shown in FIG. 2B, can result in irregular data flow, which can make hardware implementation inefficient. In another example, the hardware utilization would be low during the examination of the multiple MVPs because the random nature of the final chosen MVP can make it difficult for pipeline implementation. In another example, recall that the multiple MVPs can be different points in the search area. Thus, the reference pixels associated with the MVPs are loaded separately and cannot be re-used, which can cause high memory bandwidth and high latency. In a further example, a large amount of past MVs are saved on-chip for hardware implementation of multiple MVPs. This can lead to significant on-chip memory demands and costs.

Figure 2C:
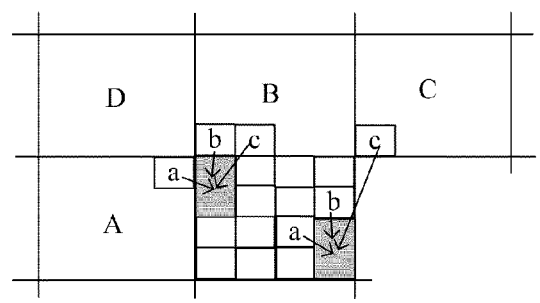
FIG. 2C illustrates spatially varying definitions of left, top, and top-right sub-blocks.

In order to achieve efficient hardware implementation, some aspects disclosed herein utilize a single MVP (SMVP) in the proposed RDOMFS rather than multiple MVPs. A unified SMVP definition can be used for all sub-blocks of all sizes (or substantially all sub-blocks and/or substantially all sizes) within a MB. Using the symbol $MV_{16\times16}$ to indicate for a MB its most appropriate MV for the 16×16 sub-block size, SMVP can be defined as:

$$SMVP = \text{Median}(MV_{16\times16}^{left}, MV_{16\times16}^{top}, MV_{16\times16}^{top\_right}) \qquad (3)$$

which is the median of the $MV_{16\times16}$ of the MBs on the left, top and top-right, as shown in FIG. 2C. In other words, all (or substantially all) sub-blocks of all sizes at any location within the MB use the same or substantially the same SMVP.

Although the use of one MVP as opposed to multiple MVPs tends to result in lower probability that the local minimum is the global minimum, the performance drop is not significant. Further, the disclosed SMVP can address the problems mentioned above. For example, even though the disclosed SMVP is based on spatially neighboring MVs, the identical (or substantially identical) SMVP definition for all sub-blocks of all sizes makes the data flow regular. In another example, the MVP selection is deterministic so that the data flow becomes regular and pipeline design can be used. Actually, there is no MVP selection stage as there is only one candidate. In a further example, latency is much lower due to the absence of the MVP selection stage. In another example, the disclosed SMVP utilize the storage of much fewer past MVs and the disclosed MVP re-use scheme, as will be explained below, can further reduce the on-chip memory demands.

As it relates to regular local searches, different FMEs can use different iterative local search. For example, the FMEs can have different local search patterns, such as rectangular search, diamond search, hexagonal search, circular search, and so forth. In each iteration, the FMEs can compute the distortion measure for the search points on the patterns, and move the search center towards the most suitable point for the next iteration. The distortion measures can be SAD or RD. Different step sizes can be applied at different iterations and in different directions. Further, early termination can be used so that the search can stop when an adequate condition is found. Otherwise, the search can typically stop when the most suitable point is in the center of the pattern, or when a certain maximum iteration is reached.

There are some drawbacks for the above-mentioned local searches. For example, the searches are greedy algorithms and can tend to achieve lower rate-distortion performance than a local full search. In another example, pixels associated with the candidates on the search pattern are loaded separately and cannot be re-used, which cause high memory bandwidth and high latency. In a further example, the winner among the candidates is unpredictable, which can lead to irregular data flow and inefficient hardware implementation. Similarly, early termination and different step sizes can cause a similar problem. To mitigate the challenges associated with regular local searches, various aspects disclosed herein utilize a predictable local full search in RDOMFS. Thus, the RDOMFS is FS-mvp.

As previously mentioned, there is a tradeoff between the two common distortion measures: SAD and RD. SAD computation can be consistent and can be suitable for efficient hardware implementations. Most existing ME hardware architectures are designed based on SAD. On the other hand, RD is defined as:

$$RD(MV) = SAD(MV) + \lambda(Qp)R(|MV_{median} - MV|) \qquad (4)$$

where MV is the candidate MV, $\lambda$ is the Lagrange multiplier, which changes with the quantization parameter Qp, $MV_{median}$ is the median motion vector predictor for MV coding in H.264 and R is the bit rate to encode the motion vector difference. In H.264 JM software, the $\lambda$ is $\lambda_{ME}$ which is defined as:

$$\lambda_{ME} = \sqrt{\lambda_{mode}} \qquad (5)$$

where $\lambda_{mode}$ is:

$$\lambda_{mode,I,P} = 0.85 \times 2^{(Qp-12)/3} \qquad (6)$$

for I-block and P-block and is:

$$\lambda_{mode,B} = \max\left(2, \min\left(4, \frac{Qp-12}{6}\right)\right) \times \lambda_{mode,I,P} \qquad (7)$$

for B-block. While RD can, at times, provide improved RD performance as compared to SAD, it is hard to design efficient hardware for RD for a number of reasons. For example, RD computation uses floating point operation for the multiplication of $\lambda$ and R which can be time and resource consuming. If this is to be relieved by using lookup tables, it would utilize a huge chip area for the lookup tables. In another example, the data flow in the computation of $MV_{median}$ can be irregular and can utilize a large amount of on-chip memory to store the needed past MVs as discussed previously.

In RDOMFS, as disclosed herein, the performance of RD can be realized as well as the hardware-implementable nature of SAD. Thus, disclosed herein is a hardware-implementable RD-similar cost function $RD_{smvp}$, defined as:

$$RD_{smvp}(MV) = SAD(MV) + \lambda_{smvp}(Qp)R(|SMVP - MV|) \qquad (8)$$

where the irregular $MV_{median}$ is replaced by a regular SMVP as defined in Eqn. 3, and the floating point $\lambda$ is replaced by a hardware-implementable power-of-2 $\lambda_{smvp}$ $$\lambda_{smvp} = 2^n; n = \text{floor} \frac{\ln \lambda_{ME}}{\ln 2} \qquad (9)$$

The disclosed $RD_{smvp}$ can address the problems mentioned above. For example, with the disclosed $\lambda_{smvp}$, the multiplication of $\lambda_{smvp}$ and R is simply a left or right shift of R by |n| bits and can be easily implemented. Performance degradation due to the approximation error between lambda and lambda$_{smvp}$ is minimal. Further, the identical (or substantially identical) SMVP definition for all sub-blocks of all sizes makes the data flow in the computation of $RD_{smvp}$ regular and the amount of consumed on-chip memory is minimized, if not eliminated (or substantially eliminated).

Figure 3:
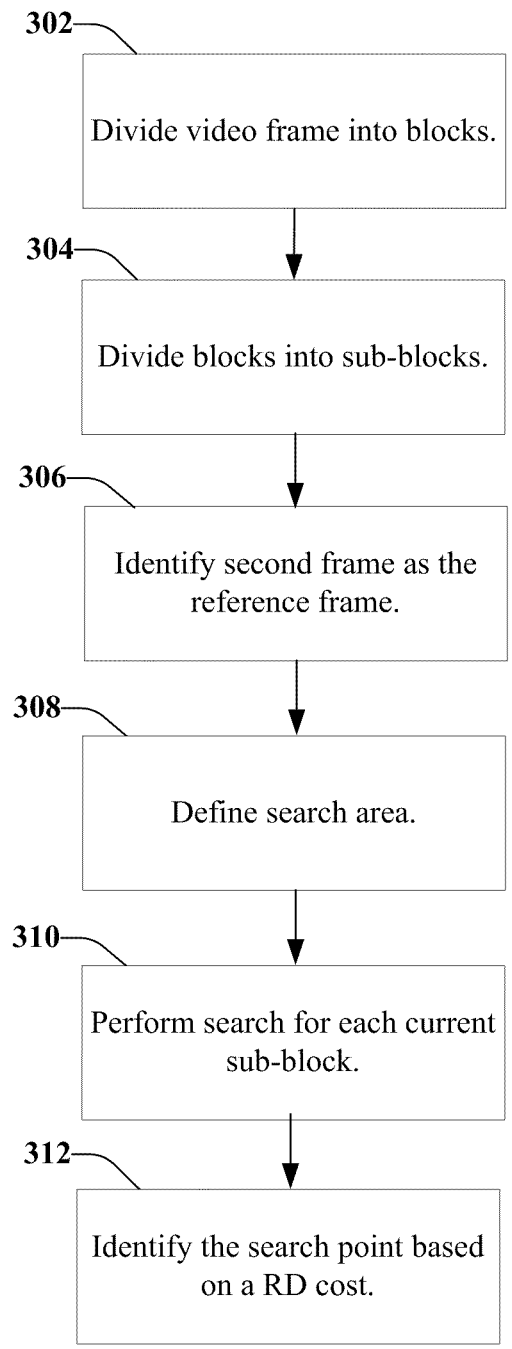
FIG. 3 illustrates a method for video compression, according to an aspect.

FIG. 3 illustrates a method 300 for video compression, according to an aspect. At 302, one or more (or each) video frame is divided into blocks. At 304, one or more blocks can be sub-divided into one or more sub-blocks. For example, each block (sometimes referred to as current block) can be sub-divided into many current sub-blocks. The sub-blocks can be different sizes and/or different shapes.

At 306, a second frame is identified as the reference frame. For each current sub-block, a search area centered around a location, referred to as the search center, is defined in the reference frame, at 308. Each point (e.g., search point) in the search area corresponds to a candidate motion vector (MV) between the current block or sub-block and a candidate reference block or candidate sub-block of same size, or substantially the same size, in the reference frame.

In an aspect, the search center is a function of a number of motion vector predictors (MVPs). Each MVP can be a function of the motion vectors of neighboring blocks or sub-blocks. For example, one MVP can be the median of the block motion vector on the left, top, and top-right (referred to as SMVP).

At 310, for each current sub-block, a search is performed. In an aspect, the search is performed by computing a RD cost function for selected search points in the search area. The most appropriate search point with the most suitable RD cost is identified, at 312. The corresponding motion vector is chosen as the appropriate MV of the sub-block.

In some aspects, the RD cost function contains more than one element. In an example, a first element in the RD cost is an additive element, which is a distortion measure between the current sub-block and the candidate reference sub-block. A second element in the RD cost can be an additive element, which is a product of a parameter (referred to as lambda) and a function of a difference between the candidate MV and a MVP. The MVP in the second element of the RD cost can be a function of the motion vectors of neighboring blocks or sub-blocks (single MVP). In some aspects, for all sub-blocks in the current block, the same (or a similar) MVP (e.g., unified) is used.

In some aspects, the MVP is a function of the most appropriate motion vectors of the neighboring blocks. In other aspects, the MVP is the median of the appropriate motion vectors of the casual (e.g., past) neighboring blocks. According to some aspects, the MVP is the median of the most appropriate motion vector of three past neighboring blocks. For example, the three past neighboring blocks can be the one on the left, the one on the top, and the one on the top-right. If one or more of such are not available, they can be replaced by an alternative block, such as the top-left block or by some pre-defined MVP value(s).

In accordance with some aspects, the search center is the MVP. According to some aspects, the search center is the median of the most appropriate motion vectors of three past neighboring blocks. For examples, the three past neighboring blocks can be the one on the left, the one on the top, and the one on the top-right. In response to one or more of these three past neighboring blocks not being available, the one or more blocks can be replaced by at least one alternative block, such as the top-left block or by pre-defined MVP values or configurable MVP values.

According to some aspects, the lambda parameter in the second element of the RD cost depends on the sub-block size, location, and other properties; the block location, type, and other properties; the quantization parameters and other properties, the target bit rate behavior, and buffer condition and properties, and so forth. In some aspects, the lambda parameter in the second element of the RD cost is approximated by a value easy to compute, such as a linear combination of some power-of-2.

In some aspects, the MVP used in the second element of the RD cost is a function of the motion vectors of past neighboring blocks. In another aspect, the MVP used in the second element of the RD cost is a function of the motion vectors of past neighboring block on the left, top, and top right. In some aspects, the MVP used in the second element of the RD cost is the median of the motion vectors of past neighboring block on the left, top, and top right.

Figure 4:
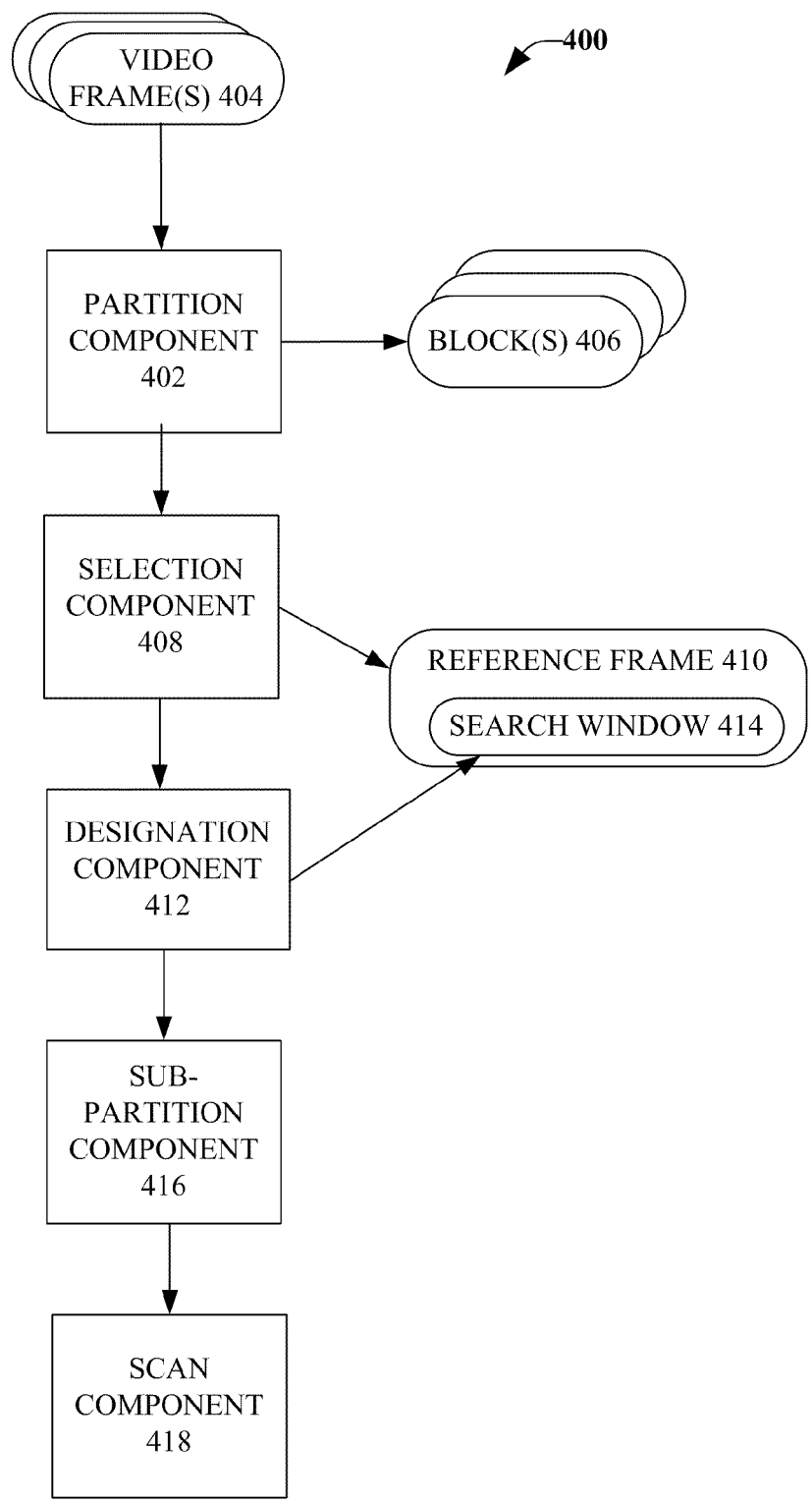
FIG. 4 illustrates a system, according to an aspect.

In another implementation, FIG. 4 illustrates a system, according to an aspect. Included in the system 400 is a partition component 402 configured to divide one or more video frames 404 into blocks 406, sometimes referred to as "current block". A selection component 408 is configured to identify a second frame as a reference frame 410. A designation component 412 is configured to define a search window 414 in the reference frame 410. The search window 414 can be a piecewise rectangular search area. Points (referred to as "search point") in the search area (or search window 414) correspond to a candidate motion vector (MV) between the current block and a candidate reference block of the same or a similar size in the reference frame 410.

A sub-partition component 416 is configured to sub-divide the search window 414 into rectangular sub-windows such that all, or substantially all, search points in the search window belong to some sub-windows. In some aspects, the rectangular sub-windows can be a same size, a similar size, or can be different sizes. In other aspects, the sub-windows can be a shape other than rectangular (e.g., square).

Also included in system 400 is a scan component 418 configured to establish a sub-window scanning order among the sub-windows. The scan component 418 can establish the sub-window scanning order such that each sub-window is scanned at least once. Further, the scan component 418 can establish the sub-window scanning order such that any two adjacent sub-windows in the sub-window scanning order can be spatially close.

In an example, each sub-window can be scanned with about sixteen possible types of snake scan (SS)). For example, eight snake scans use horizontal scan and the other eight snake scans use vertical scan. In horizontal scan, the scan component 418 scans the first row horizontally in a first direction. When reaching the end of the row, the scan component 418 continues to the adjacent search point in the next row, and scans the row in a second (or reverse) direction (e.g., the direction opposite the direction the first row was scanned). In an aspect, the first row can be at the top or the bottom of a sub-window. The first direction can be from left to right or from right to left. After scanning the second row, a next row is scanned in the first direction (e.g., the direction opposite the direction the second row was scanned), and so forth until all the rows are scanned.

In vertical scan, scan component 418 scans the first column vertically in a first direction. When reaching the end of the column, the scan component 418 continues to the adjacent search point in the next column and scans the column in a second direction (e.g., a direction opposite the first direction), and so on until all the columns are scanned. The first column can be at the left or the right of a sub-window. The first direction can be from bottom to top or from top to bottom.

For the horizontal (or vertical) scan, there are four possible starting points, which are upper-left corner, upper-right corner, lower-left corner, and lower-right corner. Each starting point, if there is an odd number of rows (or columns) in the sub-window, the ending point is the diagonally opposite point (e.g., lower-right corner is diagonally opposite the upper-right corner). If there is an even number of rows (or columns) in the sub-window, the ending point is the last point in the last row (or column), away from the diagonally opposite point. With four possible starting points (e.g., the four corners) and the odd/even number of rows (or columns), there are eight SSs that use horizontal (or vertical) scan.

After the scan component 418 scans one sub-window (using one of the sixteen types of snake scan), the scan component 418 moves to an adjacent search point in a second sub-window (e.g., the next one according to the sub-window scanning order). In an aspect, the second sub-window can be a different size than the first sub-window. In some aspects, a different snake scan (of possibly different type) is performed for the second sub-window than the snake scan performed for the first sub-window.

System 400 can be a reconfigurable architecture for RDOMFS based on 2-D systolic PE array, according to some aspects. As mentioned above, the RDOMFS is more consistent than FS-RD-var-mvp due to the use of SMVP and hardware-implementable RD-similar cost function.

A straight-forward hardware design for RDOMFS can include several components: a 2-D systolic PE array with one PE to process one pixel, an adder tree to calculate around forty-one possible SADs for all the possible sub-blocks, on-chip or off-chip memory to store all the past MVs utilized for the computation of SMVP. For the local FS, the common scanning order is the raster scan order, which can achieve an adequate data re-use ratio.

However, the RDOMFS design typically have several problems. For example, the design cannot achieve a different data re-use ratio without significant hardware changes. In other words, it is not re-configurable. In another example, while raster scan can provide good data re-use ratio, it does not fully exploit the potential data re-use possibility. For example, it has good data re-use in the horizontal direction, but not in the vertical direction. Ineffective data re-use can result in high power consumption, an increase of the size of the on-chip memory, and high latency. In another example, past MVs are stored in on-chip or off-chip memory for the calculation of SMVP in RDOMFS. Although the memory usage of SMVP is already rather small with the use of $MV_{16\times16}^{left}$, $MV_{16\times16}^{top}$, and $MV_{16\times16}^{right}$, it would still cause considerable latency and power consumption to load the utilized MVs.

While the straightforward design can achieve good performance, the disclosed aspects can overcome the above-mentioned issues. For example, the disclosed aspects can be reconfigurable. In another example, the disclosed aspects can achieve higher data re-use ratio, even in the vertical direction. In a further example, the disclosed aspects can be configured to not store past MVs (or to only store a minimum number of past MVs). In accordance with some aspects, a Smart Snake (SS) scanning order is utilized instead of raster scan. The SS can be designed to achieve different data re-use ratios and to mitigate redundant data loading. The disclosed aspects can also provide a multi-resolution MVP re-use scheme based on SS to mitigate the storage of past MVs.

Figure 5:
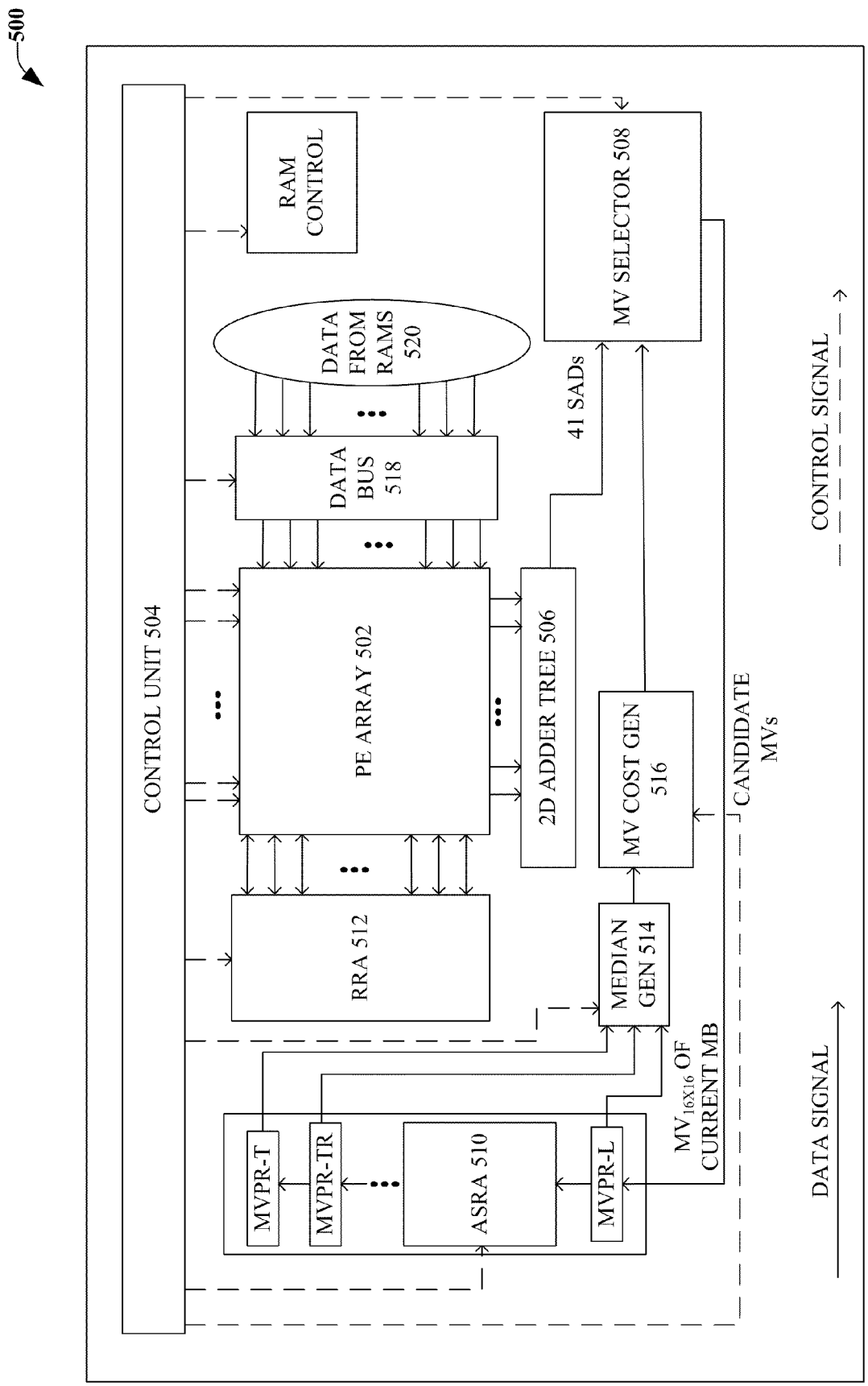
FIG. 5 illustrates top-level block diagram of the disclosed aspects.

A top-level block diagram 500 of one or more of the disclosed aspects is shown in FIG. 5. The block diagram 500 is based on a 2-D PE array 502 and includes a control unit 504. Each PE computes the SAD for 1 pixel. Different pixel-wise SAD is combined in A 2D Adder Tree 506 (2DAT) to compute the 41 possible SADs for sub-blocks of different sizes. The 41 SADs can be conveyed to a MV selector 508.

The $MV_{16\times16}$ of past MBs can be propagated in an Adaptive Shift Register Array (ASRA 510) and can be used to compute the SMVP which in turn is used to compute the MV cost. Finally, the $RD_{smvp}$ is computed by adding the product of $\lambda_{smvp}$ and MV cost to the SAD, and the most suitable sub-block combination with its corresponding most suitable MV can be selected.

The 2-D PE 502 array contains 256 PEs. Each PE stores a pixel in the current 16×16 MB. Reference pixels can be propagated into the PE array 502 to calculate SAD. Conceptually, the PE array has 16 sub-arrays each with 4×4 PEs corresponding to a 4×4 subblock. A Reconfigurable Register Array (RRA 512) is included to help achieve reconfigurable capability and higher data re-use ratio. The RRA 512 is for the proposed SS scanning order, which will be discussed below.

After the pixels of current 16×16 MB are loaded, reference pixels can be propagated into the PE array 502. In each clock cycle, the 256 PEs compute the 256 pixel-wise SAD for a search location in the search windows and pass the pixel-wise SAD to the 2DAT 506. Among the 41 SADs to be computed, there are sixteen 4×4 SADs, eight 8×4, eight 4×8, four 8×8, two 16×8, two 8×16 and one 16×16. The 2DAT can utilize 2 clock cycles to compute the sixteen 4×4 SADs, 3 clock cycles for the eight 8×4 and eight 4×8, 4 clock cycles for the four 8×8, 5 clock cycles for the two 16×8 and two 8×16 and 6 clock cycles for the 16×16.

The $MV_{16\times16}$ of past MBs propagated in ASRA 510 can be re-used to compute the SMVP during the loading phase of the current MB pixels, and thus SMVP computation does not utilize extra clock cycles. A reconfigurable feature is that the delay cycles in ASRA can be adjusted so that it can be easily adapted to different frame size.

The SMVP is used to compute the MV cost, which is passed (at substantially the same time as the 41 SADs from 2DAT) to the Best MV Selector (BMVS). For example, the data is processed through a median generator 514 and a MV cost generator 516 and then to the MV selector 508. The hardware-implementable RD-similar cost function of all the candidate MVs can be compared and the best MV is selected after scanning all possible locations in the search window.

In an aspect, a data bus 518 is configured to receive data from RAMS 520. The data bus 518 is configured to read N pixels in parallel in one clock cycle, wherein a block of the reference frame comprises N×N pixels. The RRA 512 is configured to store data in a row for use in a next row, wherein the N pixels are loaded once within the plurality of sub-windows.

Consider a search window of size 2P×2Q and a macroblock size of N×N. When full search is performed in the window, most traditional architectures use Raster Scan as shown in FIG. 6A. In raster scan, the search point in the first row is scanned from left to right, then the second row from left to right, and so on until all search points are scanned in the window. Raster scan is effective in reusing data in the horizontal direction and can achieve relatively high data re-use ratio. For example, when the block corresponding to a search point A in FIG. 6A is processed, all the pixels in the N×N block are loaded into the PE array. When the next search point B in raster scan is processed, 1×N pixels are loaded. In other words, (N−1)×N pixels are re-used. There is no data re-use between adjacent rows. Thus, many pixels can be loaded up to N times, with N−1 of them being redundant loading.

The data re-usability is improved slightly in some conventional architectures by another scanning order called Snake Scan as shown in FIG. 6B. In Snake Scan, the search points in the first row is scanned from left to right, then the second row from right to left, and then the third row from left to right, and so on. During horizontal scanning along a row, Snake Scan re-use (N−1)×N pixels from one search point to another. Snake Scan is slightly more enhanced than Raster Scan because it can re-use data between adjacent rows. After row k is processed, (N−1)×N pixels of the last search point in row k are reused in the first search point in row k+1. However, when processing the subsequent search points (in horizontal direction) in row k+1, the pixels loaded during row k processing are not re-used leading to a large amount of redundant loading of the data. Note that in both Raster Scan and Snake Scan, the data re-use ratio is fixed.

Disclosed herein is a scanning order, referred to as Smart Scan (SS), which can achieve variable data-reuse ratio and minimize redundant data loading. In particular, in each search window, each pixel is loaded once and only once in SS.

In the proposed Smart Snake scan, the search window is divided into an array of non-overlapping rectangular sub-regions that span the search window. An example with two rows and three columns of sub-regions is shown in FIG. 6C. For example, in each rectangular sub-region, a Snake Scan is performed to achieve significantly higher data re-use. After one sub-region is searched, it can move into an adjacent region and Snake Scan can be applied again. In different sub-regions, the Snake Scan may be performed from top to bottom (e.g. sub-region $L_1$), or from bottom to top (e.g. sub-region $L_2$). It may start from left and end at right (e.g. sub-regions $L_1$, $L_2$, $L_3$), or start from right and end at left (e.g. sub-regions $L_4$, $L_5$, $L_6$). It may be horizontal (e.g sub-regions $L_1$, $L_2$) or vertical (e.g. sub-region $L_3$, $L_4$). Here "horizontal" is used to mean the original Snake Scan which processes the search points row-by-row and "vertical" is used to mean column-by-column Snake Scan.

The width of each sub-region can be less than or equal to a parameter M. A structure, referred to as Reconfiguration Register Array (RRA), which is an array of (M−1)*(N−1) registers, is constructed. The data loading behavior of Smart Snake in $L_1$, which contains two initialization steps (A and B) utilized for $L_1$ and two steady-state steps (C and D) common to all sub-regions will now be described. It is assumed the size of $L_1$ is W×H, with W<=M. Step A in Smart Snake is used to process the top-left search point in $L_1$. Step B is performed W−1 times to process the remainder of the top row (row 1) of $L_1$ moving from left to right. Then in steady state, after processing one row in one direction (e.g., from left to right in row 1), it can use step C to move to the next row and step D is performed W−1 times to process the rest of the row in opposite direction (e.g., from right to left in row 2).

In Step A, the N×N reference pixels corresponding to the upper-left search point can be propagated into the PE array, 1 clock cycle for each column of N pixels. This takes N set-up clock cycles with a data loading rate of N pixels/cycle. After SAD computation, the right N−1 columns can be propagated within the PE array as they are used for the following search points in row 1. The bottom N−1 pixels of the remaining (left) column might be used for future search points (in rows 2, 3, etc) and thus are propagated from the PE array to the RRA. The top pixel of the left column is discarded, as it is no longer utilized.

Step B is applied after Step A. Step B uses W−1 clock cycles to process the remaining W−1 search points in row 1. In each clock cycle, a new search point is processed in which a new column of N pixels is loaded (at N pixels/cycle). The right N−1 columns are propagated within the PE array and the bottom N−1 pixels of the remaining column is propagated from the PE array to the RRA.

After a row of search points are processed, Step C is applied to move down 1 search point to the next row in one clock cycle. The bottom N−1 rows can be propagated within the PE array and a new row of N pixels can be loaded (at N pixels/cycle). The RRA remains unchanged.

Step D is applied after Step C. Step D uses W−1 clock cycles to process the remaining W−1 search points in the current row. In each clock cycle, only one new pixel is loaded, N−1 pixels are propagated back from the RRA and N−1 columns are propagated within the PE array. Thus the data loading rate can be reduced from N pixels/cycle in Steps A, B, and C to only 1 pixel/cycle in Step D. The bottom N−1 pixels of the remaining column can be utilized for future search points and thus are propagated from the PE array to the RRA. Steps C and D can be applied recursively until the last search point in $L_1$ is reached. Note that there is no redundant data loading in $L_1$.

After one sub-region is processed, a neighboring sub-region is processed next, using Snake Scan. Thus four steps, A', B', C' and D', similar to corresponding Steps A, B, C, D in $L_1$ are used. In an aspect, Steps B', C' and D' are similar to Steps B, C, D respectively, except that their processing directions may be different (width-wise processing to the right or left, or length-wise processing to the top or bottom). However, Step A' is different from Step A, in the sense that Step A' uses only 1 clock cycle to process the first search point, and it performs either Step B or Step C depending on the relative locations of the two sub-regions and their Snake Scan directions (vertical or horizontal). This is applied recursively until all the sub-regions are processed.

In the case of only one sub-region such that W=2P=M, there is no redundant data loading and hardware utilization can reach almost one hundred percent. Thus, in some aspects P=8. When there are more than on sub-region, most reference pixels are loaded once but some are loaded twice. For example, between $L_1$ and $L_2$, (N−1)×H reference pixels are loaded twice. By adjusting the size of each sub-region, the disclosed aspects can achieve variable data re-use ratios.

Figure 7:
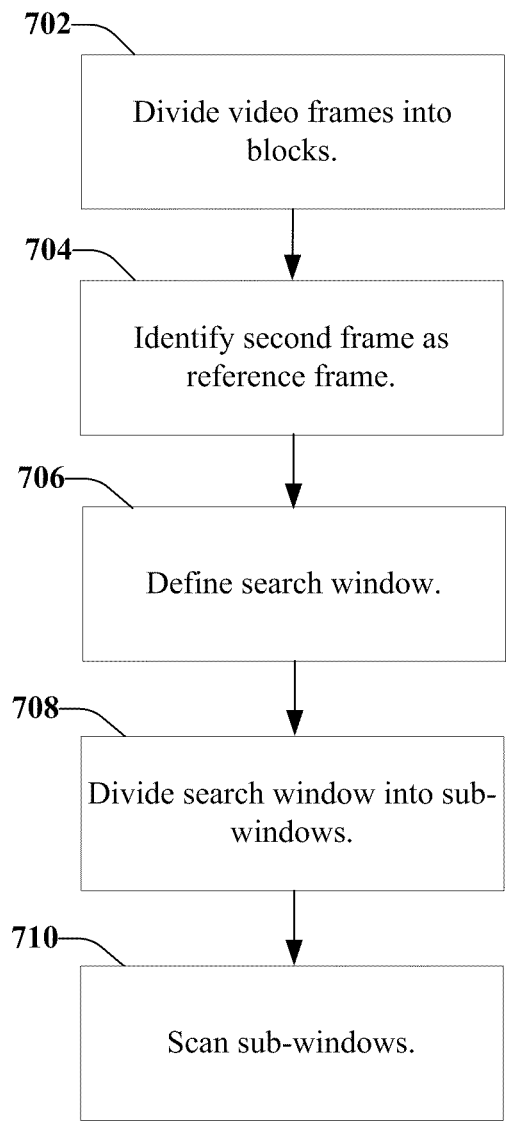
FIG. 7 illustrates a method for processing video, according to an aspect.

FIG. 7 illustrates a method 700 for processing video, according to an aspect. At 702, each video frame is dividing into blocks (e.g., current block). At 704, a second frame is identified as the reference frame. A piecewise search area (e.g., search window) is defined, at 706, in the reference frame. The search area can be rectangular. Each point (e.g., search point) in the search area can correspond to a candidate motion vector (MV) between the current block and a candidate reference block of a same or a similar size in the reference frame.

At 708, the search window is subdivided into sub-windows. The sub-windows can be rectangular. In some aspects, the sub-windows may or not have a same or a similar size. The search window is sub-divided such that all search points in the search window belong to some sub-windows. According to some aspects, the search window is sub-divided into non-overlapping sub-windows. The non-overlapping sub-windows can be rectangular sub-windows. In some aspects, the rectangular sub-windows can be the same size or substantially the same size.

The sub-windows are scanned, at 710. A sub-window scanning order can be established among the sub-windows such that each sub-window is scanned at least once. In some aspects, the sub-windows are scanned such that any two adjacent sub-windows in the sub-window scanning order are spatially close.

For example, each sub-window can be scanned with one of sixteen different kinds of snake scans. Eight snake scans can use horizontal scan and the other eight snake scans can use vertical scan. In horizontal scan, the scan is performed by scanning the first row horizontally in a first direction. The first row can be the top or the bottom of a sub-window. The first direction can be from left to right or from right to left. When the end of the first row is reached, the scan proceeds to the adjacent search point in a next row and scans the row in the reverse direction, and so on.

In vertical scan, the scan is performed by scanning the first column vertically in a first direction. The first column can be at the left or right of a sub-window. The first direction can be from bottom to top or from top to bottom. When the scan reaches the end of one column, it proceeds to the adjacent search point in the next column and scans the column in the reverse direction, and so on.

For the horizontal (or vertical) scan, there are four possible starting points, which are the upper-left corner, upper-right corner, lower-left corner, and lower-right corner. For each starting point, if there is an odd number of rows (or columns) in the sub-window, the ending point is the diagonally opposite point (e.g., lower-right corner is diagonally opposite the upper-right corner). If there is an even number of rows (or columns) in the sub-window, the ending point is the last point in the last row (or column), away from the diagonally opposite point. With four possible starting points (e.g., the four corners) and with an odd or even number of row (or columns), there are eight snake scans that use horizontal (or vertical) scan.

After one sub-window is scanned using one of the sixteen types of snake scan, the scan proceeds to an adjacent search point in a second sub-window (e.g., next one according to the sub-window scanning order). The second sub-window can be a different size than the first sub-window. In some aspects, another snake scan, of possibly different kind, is performed for the second sub-window.

In accordance with some aspects, the sub-window scanning order is that of a snake scan using either a horizontal scan or a vertical scan. The horizontal or vertical scan can start from an upper-left corner, an upper-right corner, a lower-left corner, or a lower-right corner of the search window.

According to some aspects, the sub-window scanning order divides the search window into regions and applies snake scan locally in the regions.

In some aspects, a block contains N×N pixels, and an N×N PE array is utilized to compute N^2 pixelwise SAD computation between the current block and the reference block. A data bus is configured to read N pixels in parallel in one clock cycle. A (M−1)*(N−1) reconfigurable register array (RRA) is used to store data in a row for use in the next row. With the RRA, every data point (pixel) is loaded once (and only once) within a sub-window. A first set of at least four steps (e.g., A, B, C, and D) are applied to load data for the search points in the very first sub-window scanned in a window. A second set of at least four steps (e.g., A', B', C', and D') are applied to load data for the subsequent sub-windows. The first step of the first set (e.g., A) takes N clock cycles to process one search point. All other steps (e.g., B, C, D, A', B, C', and D') take only one clock cycle to process one search point. The data loading rate is N pixels per clock cycle for the first three steps in the first set (A, B, C) and the second set (A', B', C') and only one pixel per clock cycle for the fourth step in the first set (D).

In accordance with some aspects, Steps A and B are used to process the first row (or column) of the first sub-window. Step A is applied once for the starting search point of the first sub-window and it can take N clock cycles with a data loading rate of N pixels per cycle. Then Step B is applied N−1 times to process the remaining search points in the row (or column) and it takes N−1 clock cycles with a data loading rate of N pixels per cycle.

According to some aspects, step A is the initialization step and all the pixels of the reference block corresponding to the starting point of the firs sub-window are loaded into the PE array. As N pixels are loaded in one clock cycle, Step A can take N clock cycles. After the pixelwise SAD computation, at least two events can occur to prepare for Step B processing of the next search point. For example, N−1 columns (or rows) in the leading edge (toward the next search point) are propagated in the PE array, while N−1 pixels of the last column (or row) are propagated into a reconfigurable register array (RRA) to be used in the next row.

According to some aspects, step B, having one column (or row) in the leading edge is loaded into the PE array. Step B is applied and finished in one clock cycle to process one new search point. After the pixelwise SAD computation, N−1 columns in the leading edge are propagated in the PE, while N−1 pixels of the last column (or row) is propagated to the RRA after the columns (or rows) are rotated in RRA. In an aspect, end-of-row (or end-of-column) treatment can occur in the last search point of the first row to prepare for Step C processing of the next search point in the second row (or column). Instead of performing column propagation, it propagates N−1 rows (or columns) in the leading edge (towards the next search point) in the PE array. The RRA remains unchanged (e.g., no data propagation and no rotation).

In accordance with some aspects, after the first row is scanned, subsequent rows of the sub-window are processed by steps C and D. After one row (or column) is scanned, steps C and D are used to process to the next row (or column). For example, Step C is applied once for the starting point of the row (or column). It can take one clock cycle with data loading rate of N pixels per cycle. Step D is applied N−1 times to process the remaining N−1 search points in the row (or column). It can take about N−1 clock cycles with a data loading rate of one pixel per cycle.

In some aspects, Step C moves to an adjacent search point in the next row (or column). A new row (or column) is loaded in the PE array. After the SAD computation, N−1 columns (or rows) in the leading edge (towards the next search point) are propagated in the PE array while N−1 pixels of the last column are propagated to the RRA after the columns are rotating in the RRA.

According to some aspects, step D has one new pixel loaded and one (N−1)-pixel column of the RRA is propagated into the PE array to form a new N-pixel column (or row) in the leading edge. One step D can be applied and finished in one clock cycle to process one new search point. After the pixelwise SAD computation, N−1 columns in the leading edge are propagated in the PE array, while N−1 pixels of the last column (or row) is propagated to the RRA after the columns (or rows) are rotated in RRA. End-of-row (or end-of-column) treatment can occur in the last search point of the row to prepare for Step C processing of the next search point in the next row. Instead of performing column propagation, it propagates N−1 rows (or columns) in the leading edge (towards the next search point) in the PE array. The RRA remains unchanged (e.g., no data propagation, no rotation). A form of treatment also occurs to process the last search point of the current sub-window.

In accordance with some aspects, after one sub-window is processed, Step A' is used to transition from the last search point of the current sub-window to the starting point of the next sub-window (according to the sub-window scanning order). The two search points can be next to each other. If transition is a horizontal (or vertical) move, end-of-row (or end-of-column) treatment is performed in the last search point is to propagate N−1 columns (or rows) in the leading edge and the RRA remains unchanged.

If the transition is a horizontal (or vertical) move, Step A' is one step of Step B in which a new column (or row) in the leading edge is loaded. If the new sub-window performs horizontal scan (or vertical scan), N−1 columns (or rows) are propagated in the PE array and N−1 pixels of the last column (or row) are propagated into the RRA after the SAD computation. Step A' takes one clock cycle and the data loading rate is N pixels per cycle. Then Steps B', C', and D' are applied to process the remainder of the sub-window in a similar manner as Steps B, C, and D in the first window, as described above. Step B' is applied N−1 times to process the remaining search points in the row (or column if vertical scan). Steps C' and D' are applied recursively to process the remaining rows (or columns). For each row, Step C' is applied one time to change direction and process the first search point and Step D' is applied N−1 times to process the remaining N−1 search points. Steps B', C', and D' can be substantially the same as Steps B, C, and D, and the direction may be different depending on whether horizontal scanning or vertical scanning is applied in the new sub-window.

In some aspects, a block contains N×N pixels. The block may be rectangular in shape and of size M×N. The corresponding PE array can contain M×N PEs. A data bus is configured to read max (M,N) pixels in parallel in one clock cycle. The corresponding RRA can be of size (M−1)×(N−1). The corresponding column and row sizes are N and M respectively. The data loading rate of steps A, B, C, A', B', and C' may be M or N pixel/cycle, depending on whether vertical scanning or horizontal scanning is prevailing. In a similar manner, either M−1 or N−1 pixels can be propagated to RRA depending on the prevailing vertical or horizontal sub-block scanning order. In a similar manner, Steps B, D, B', and D' are applied either N−1 or M−1 times. Step A may take M or N clock cycles.

In accordance with some aspects, a data bus can be configured to read a*N/b pixels in one cycle where a and b are integers. To load N pixels, it can take at least b/a clock cycles (e.g., instead of one clock cycle). In some aspects, RRA can be larger than (M−1)*(N−1).

In accordance with some aspects, a component can be configured for Step A such that the N×N reference block can be loaded in an arbitrary number of clock cycles with a corresponding data loading rate.

According to some aspects, the second row may be above or below the first row. The second column may be to the left or to the right of the first column. The start search point of a sub-window may be the upper-left corner, the upper-right corner, the lower-left corner, or the lower-right corner. The width (and height) of a sub-window can be even or odd. Either horizontal or vertical scanning can be used.

In an aspect, the SAD can be replaced by other distortion measures, such as MSE, and so forth, or other cost functions.

In an aspect, a block can contain N×N pixels, and an N×N PE array can be utilized to compute N^2 pixelwise SAD computation between the current block and the reference block. The data bus is configured to read N pixels in parallel in one clock cycle. A (N−1)*(N−1) reconfigurable register array is utilized to store data in a row for use in the next row. With the RRA, every data point (pixel) is loaded once and only once within a sub-window. Four Steps: A, B, C, and D are applied to load data for the search points in the very first sub-window scanned in a window and four steps: A', B', C', and D' are applied to load data for the subsequent sub-windows. Apart from Step A, which takes N clock cycles to process one search point, the other steps take only one clock cycle to process one search point. The data loading rate is N pixels per clock cycle for Steps A, B, C, and A', B', C, and only one pixel per clock cycle for step D.

Steps A and B can be used to process the first row (or column) of the first sub-window. Step A is applied once for the starting search point of the first sub-window and it takes N clock cycles with a data loading rate of N pixels per cycle. Step B is applied N−1 times to process the remaining search points in the row (or column) and it takes N−1 clock cycles with a data loading rate of N pixels per cycle.

In Step A, which is the initialization step, all the pixels of the reference block corresponding to the starting point of the first sub-window are loaded into the PE array. As N pixels are loaded in one clock cycle, Step A can take N clock cycles. After the pixelwise SAD computation, to prepare for Step A processing of the next search point, N−1 columns (or rows) in the leading edge (toward the next search point) are propagated in the PE array. Further, N−1 pixels of the last column (or row) are propagated into a reconfigurable register array (RRA) to be used in the next row.

In Step B, one new column (or row) in the leading edge is loaded into the PE array. One Step B is applied and finished in one clock cycle to process one new search point. After the pixelwise SAD computation, N−1 columns in the leading edge are propagated in the PE, while N−1 pixels of the last column (or row) is propagated to the RRA after the columns (or rows) are rotated in RRA. End-of-row (or end-of-column) treatment occurs in the last search point of the first row to prepare for Step C processing of the next search point in the second row (or column). Instead of performing column propagation, it propagates N−1 rows (or columns) in the leading edge (towards the next search point) in the PE array. The RRA remains unchanged (no data propagation and no rotation).

After the first row (or column), all subsequent rows (or columns) of the sub-window are processed by steps C and D. After one row (or column) is finished, Steps C and D are used to process to the next row (or column). Step C is applied once for the starting point of the row (or column). It takes one clock cycle with a data loading rate of N pixels per cycle. Step D is applied N−1 times to process the remaining N−1 search points in the row (or column). It takes about N−1 clock cycles with a data loading rate of one pixel per cycle.

In Step C, the scan moves to an adjacent search point in the next row (or column. The scan loads a new row (or column) into the PE array. After the SAD computation, N−1 columns (or rows) in the leading edge (towards the next search point) are propagated in the PE array while N−1 pixels of the last column are propagated to the RRA after the columns are rotated in the RRA.

In Step D, one new pixel is loaded and one (N−1)-pixel column of the RRA is propagated in the PE array to for a new N-pixel column (or row) in the leading edge. One Step D is applied and finished in one clock cycle to process one new search point. After the pixelwise SAD computation, N−1 columns in the leading edge are propagated in the PE array, while N−1 pixels of the last column (or row) is propagated to the RRA after the columns (or rows) are rotated in RRA. End-of-row (or end-of-column) treatment occurs in the last search point of the row to prepare for Step C processing of the next search point in the next row. Instead of performing column propagation, the scan propagates N−1 rows (or columns) in the leading edge (toward the next search point) in the PE array. The RRA remains unchanged (no data propagation and no rotation). The disclosed treatment also occurs to process the very last search point of the current sub-window.

After one sub-window is processed, Step A' is used to transition from the last search point of the current sub-window to the starting search point of the next sub-window (according to the sub-window scanning order). The two search points are next to each other or spatially close. If transition is a horizontal (or vertical) move, end-of-row (or end-of-column) treatment is performed in the last search point is to propagate N−1 columns (or rows) in the leading edge and the RRA remains unchanged.

It the transition is a horizontal (or vertical) move, Step A' is simply one step of Step B in which a new column (or row) in the leading edge is loaded.

If the new sub-window performs horizontal scan (or vertical scan), N−1 columns (or rows) are propagated in the PE array and N−1 pixels of the last column (or row) are propagated into the RRA after the SAD computation.

Step A' takes one clock cycle and the data loading rate is N pixels per cycle. Then, Steps B', C', and D' can be applied to process the remainder of the sub-window in a similar manner as Steps B, C, and D in the first sub-window. Step B' is applied N−1 times to process the remaining search points in the row (or column if vertical scan). Steps C' and D' can be applied recursively to process the remaining rows (or columns). For each row, Step C' is applied one time to change direction and process the first search point and Step D' is applied N−1 times to process the reaming N−1 search points. Steps B', C', and D' can be substantially the same as Steps B, C, and D, except that the direction may be different depending on whether horizontal scanning or vertical scanning is applied in the new sub-window.

In an implementation, for a Multi-Resolution Motion Vector Predictor (MVP) re-use scheme, if there is no MVP re-use, all selected MVs are stored in on-chip or off-chip memory and then loaded back to help generate the MVPs of the current macroblock (MB) to start the searching. This would result in increased on-chip memory size, huge latency, and considerable power consumption. Thus, the disclosed aspects can utilize MVP re-use, according to an aspect.

Figure 8:
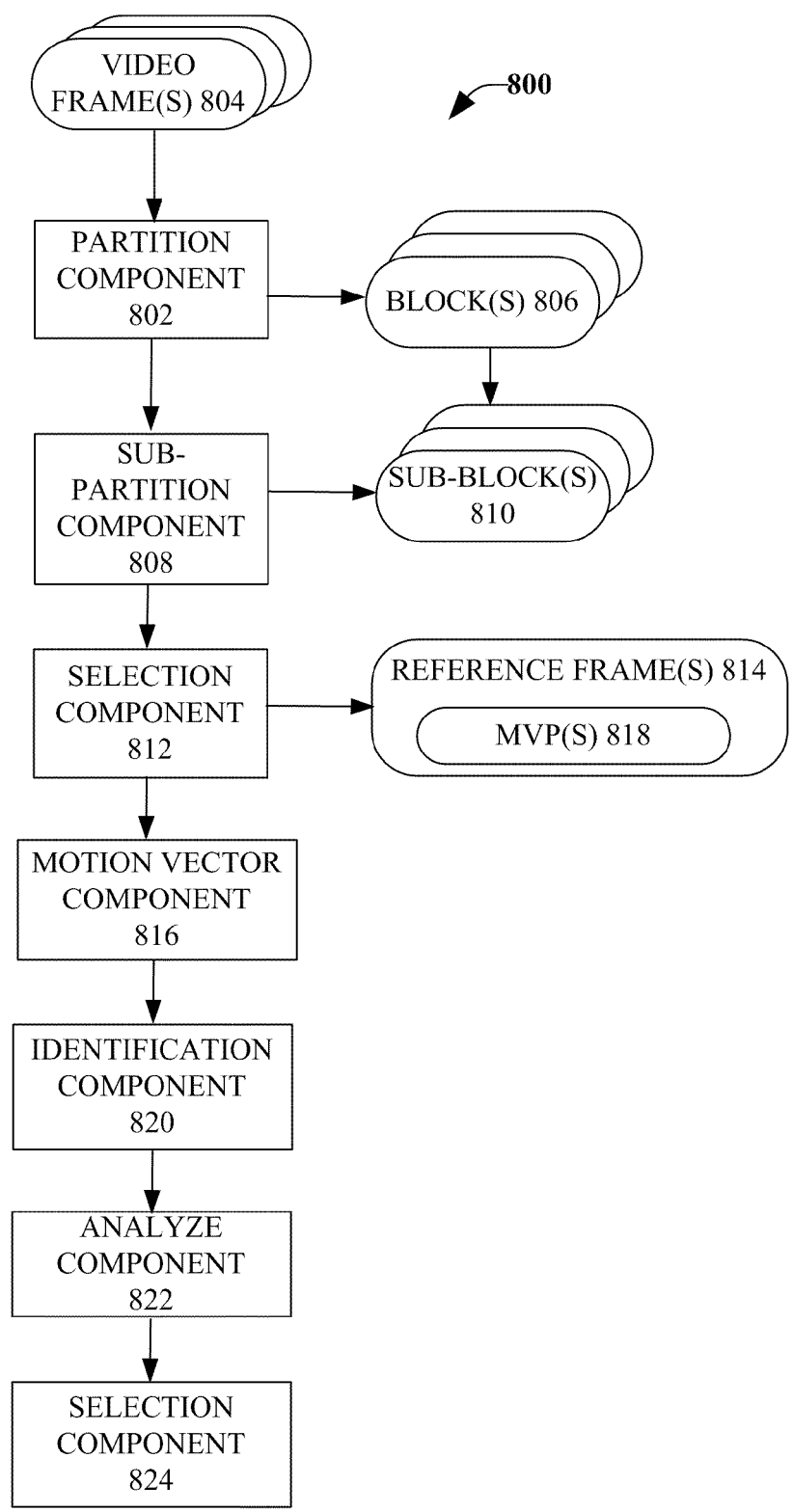
FIG. 8 illustrates a system for encoding video, according to an aspect.

Turning to FIG. 8, illustrated is a system for encoding video, according to an aspect. The video encoding system 800 can utilize a multi-resolution motion vector re-use hardware architecture, for example. Included in system 800 is a partition component 802 configured to divide one or more video frames 804 into P columns and Q rows of a block of pixels 806. In an aspect, the block of pixels can be non-overlapping. In another aspect, the block of pixels can be overlapping. For example, the block of pixels can be a rectangular N×M array of pixels. In some aspects, the block of pixels 806 can be sub-divided, by a sub-partition component 808, into one or more sub-blocks 810. The sub-blocks can have width M/a and a height N/b for an integer value of a and b (e.g., "a" may be 1, 2, 4, 8, 16, 32, and so forth; "b" may be similar to "a").

A selection component 812 is configured to identify a number of L reference frames 814. A motion vector component 816 is configured to obtain a number of motion vector predictors (MVPs 818), from the reference frames 814, based on the motion vectors of past blocks. The "past blocks" can be those blocks that have been processed before the $ij^{th}$ block. In an example, the number of MVPs obtained can be a small number. In some aspects, one of the MVP is the median of MV_left, MV_top, and MV_topRight, wherein MV_left is the motion vector of the left block (at i, j−1), MV_top is the motion vector of the top block (at i−1, j) and MV_topRight is the motion vector of the top-right block (at i−1, j+1).

A search area centered around a MVP is defined in each of the reference frames 814, by an identification component 820. An analyze component 822 is configured to perform a motion estimation for each of the possible sub-blocks in the block (or a subset thereof), and the MVPs are used in the motion estimation. A selection component 824 is configured to find the most suitable motion vectors of the possible sub-blocks in all (or substantially all) reference frames and the overall most suitable motion vectors are found for each sub-block.

For example, about L+1 motion vectors, which contain the L motion vectors, which are the most suitable motion vectors of the sub-block of size M×N (the original block) in each of the L reference frames, and the most appropriate among the L, are propagated by the system 800.

In some aspects, system 800 includes, at least in part, an Adaptive Shift Register Array (ASRA) that contains L+1 chains of K inter-connected shift registers, with one chain for each reference frame, and one chain for the overall most appropriate motion vector such that the following applies. In each chain, the output of $i^{th}$ shift register is the input to the $(i+1)^{th}$ shift register and is the value of the $i^{th}$ stage. Each time a block is processed, one clock pulse is sent to the ASRA such that the values are propagated to the next stage. At any time, the most suitable motion vectors of the K past blocks in each of the reference frames, and the most suitable overall motion vectors of the K past blocks are available in ASRA. For example, MV_left is at stage 1. MV_topLeft is at stage P+1; MV_top is at stage P. MV_topRight is stored at stage P−1. A multiplexer can be used to select MV_topRight for different possible P values. A chain of two registers at the output of the multiplexer can store the MV_topRight in the first register and the MV_top in the second register. Additional registers can be used to store additional values. For example, a third register can be used to store MV_topLeft, which may be used in some cases to compute the median MVP. Further information related to an ASRA will be provided with reference to FIG. 10 below.

In some aspects, the system 800 is configured to compute the MVPs, which are functions of the motion vectors of past blocks. For example, when a new video with P' column of blocks is to be processed, the system 800 can be reconfigured to change the multiplexer slightly to choose the MV_topRight corresponding to the new P'.

Figure 9:
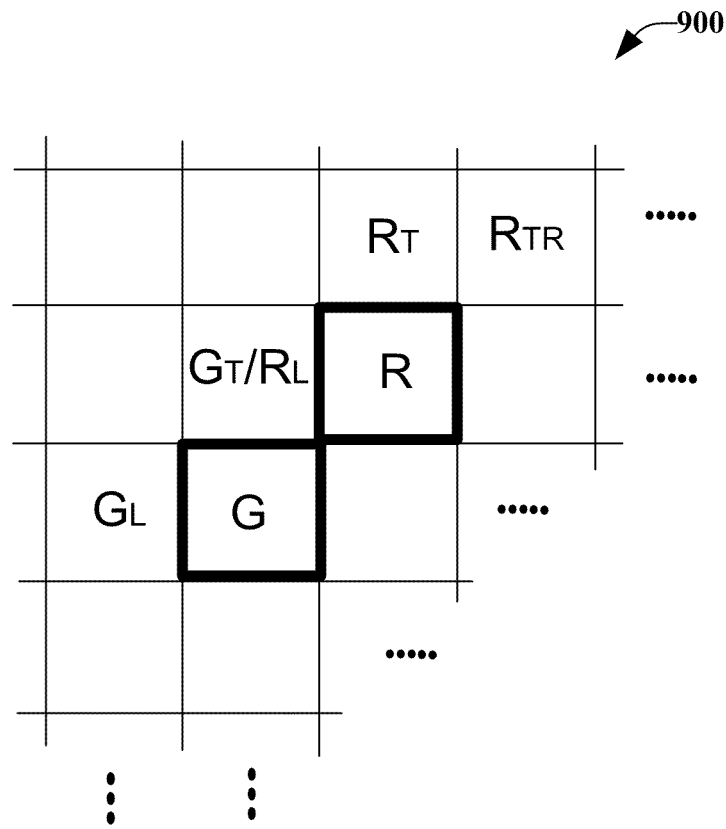
FIG. 9 illustrates the concept of a MVP re-use method as shown in a current frame.

FIG. 9 illustrates the concept of a MVP re-use method as shown in a current frame 900. In this figure, subscripts L, T, and TR are utilized to indicate the block to the left, top and top-right to a particular MB. For example, $R_{TR}$ is the block to the top-right of macroblock R. When macroblock R is processed, it can use the most suitable $MV_{16\times16}$ of three neighboring MBs: $R_L$, $R_T$, and $R_{TR}$. Similarly, the macroblock G can use MVs of $G_L$, $G_T$, and $G_{TR}$. Recall that macroblocks are processed in Raster Scan order (though the search points in the search window of a particular MB are processed in Smart Snake order). After the motion estimation is finished for one row of MBs (for example, the row containing R), the next row of MBs would be processed (for example, the line containing G). Thus, $R_L$ is equivalent to $G_T$ and the MV of $R_L$ can be re-used for G after a certain delay. The delay (in terms of clock cycles) depends on the width of the current frame. Therefore, according to an aspect, rather than storing all the $MV_{16\times16}$ of the MBs in a memory, the $MV_{16\times16}$ of left MB (e.g. $R_L$) is propagated to an adaptive shift register array (ASRA) which can propagate the MV with a variable delay, which can be different for different resolutions (frame sizes). The variable delay can provide a re-configurable design, according to an aspect.

Figure 10:
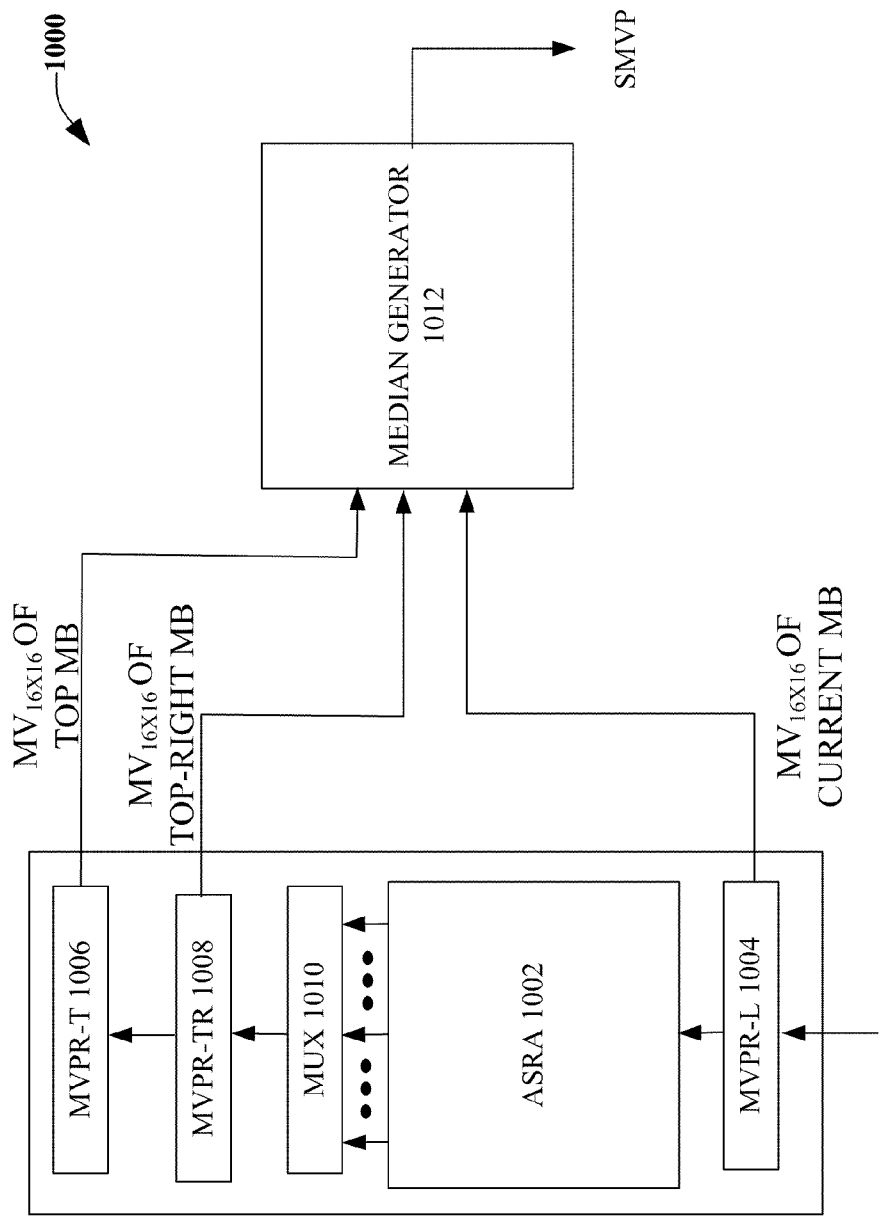
FIG. 10 illustrates an apparatus for a multi-resolution MVP re-use scheme, according to an aspect.

FIG. 10 illustrates a system 1000 for a multi-resolution MVP re-use scheme, according to an aspect. The system 1000 includes an Adaptive Shift Register Array ASRA 1002 and three MVP registers: MVPR-L 1004, MVPR-T 1006, and MVPR-TR 1008. MVPR-L 1004 is configured to store the $MV_{16\times16}$ of the left current MB. MVPR-T 1006 is configured to store the $MV_{16\times16}$ of the top current MB. MVPR-TR 1008 is configured to store the $MV_{16\times16}$ of the top-right current MB.

The ASRA 1002 contains shift registers with multiple outputs for different resolutions. A MUX 1010 is configured for use after ASRA 1002 and is configured to select the output corresponding to the resolution. The outputs of MVPR-L 1004, MVPR-T 1006, and MVPR-TR 1008 are sent to a median generator 1012, which outputs a SMVP, according to an aspect.

In an aspect, L+1 motion vectors which contain the L motion vectors, which are the most suitable motion vectors of the sub-block of size M×N (e.g., the original block) in each of the L reference frames, and the most suitable among the L are propagated.

In accordance with some aspects, an adaptive shift register array (ASRA) includes L+1 chains of K inter-connected shift registers, with one chain for each reference frame, and one for the overall most appropriate motion vector such that the following applies. In each chain, the output of $i^{th}$ shift register is the input to the $(i+1)^{th}$ shift register and is the value of the $i^{th}$ stage. Each time a block is processed, one clock pulse is sent to the ASRA such that the values are propagated to the next stage. At any time, the most appropriate motion vectors of the K past blocks in each of the reference frames, and the most suitable overall motion vectors of the K past blocks are available in the ASRA. In an example, MV_left is stage 1, MV_topLeft is at stage P+1, MV-top is at state P, and MV_to-pRight is stored at stage P−1. A multiplexer can be configured to select MV_topRight for different possible P values. A chain of two registers at the output of the multiplex can store the MV_topRight in the first register and the MV_top in the second register, for example. Additional registers can be utilized to store additional values. For example, a third register can be used to store MV_topLeft, which can be used to compute the median MVP.

Figure 11:
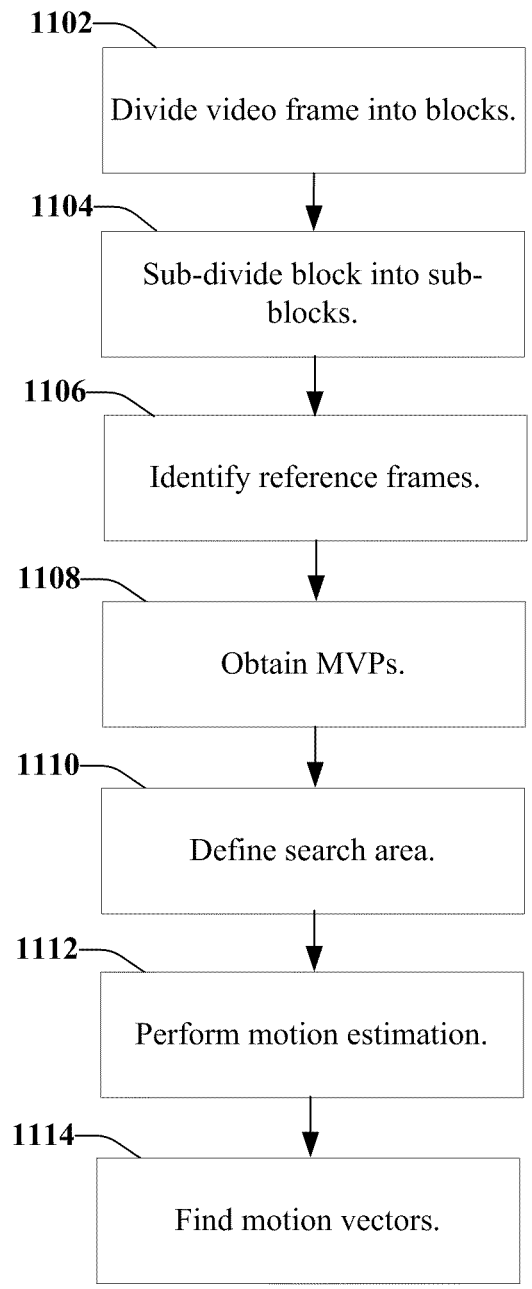
FIG. 11 illustrates a method for encoding video, according to an aspect.

FIG. 11 illustrates a method 1100 for encoding video, according to an aspect. At 1102, a video frame is divided into P columns and Q rows of a block of pixels. In an aspect, the blocks can be non-overlapping. In some aspects, the blocks are overlapping. In an aspect, the block is a rectangular N×M array of pixels. At 1104, the block is further sub-divided into one or more sub-blocks of width M/a and height N/b for an integer value of a and b. For example, "a" and/or "b" may be 1, 2, 4, 8, 16, 32, and so forth. In some aspects, the blocks are square with size N×N, with possible values of N being 4, 8, 16, 32, 64, and so forth.

For the block at (i,j), referred to as a current block, where block row index i=1, 2, . . . , P, block column index j=1, 2, . . . , Q, method 1100 continues, at 1106 where a number of L reference frames are identified. From the number of reference frames, a small number of motion vector predictors included (0,0), MV_left, MV_top, MV_topRight, MV_topLeft, the SMVP, and so forth that are computed from ASRA.

According to an aspect, the motion estimation computes a cost function. The cost function includes multiple additive terms. The first term can be a distortion term and the second term can be the product of a lambda parameters and a rate function of encoding the motion vector. In an aspect, the distortion term is SAD. In another aspect, the lambda parameter is approximated by number, which is a simple sum of a power-of-2. In another aspect, the rate function is replaced by a component configured to determine a function of the difference of the motion vector and the SMVP.

In accordance with some aspects, the various aspects can be for a video resolution of P columns and Q rows of blocks can be reconfigured with minimal change for arbitrary video resolution with P' columns and Q' rows of blocks. For example, a stage P'−1 value can be selected instead of the stage P−1 value as the multiplexer output to become the MV_topRight. For example, a large variety of MV_topRight choices for different P' values can be connected to the multiplexer input and the multiplexer output can be set easily to select different input values as the output value.

The table below show the data flow of proposed architecture for the case of N=4 and M=2. As M=2, the RRA contains two columns, Column 1 and Column 2.

| Cycle | Step | Read from the Memory | Data in RRA column 1 | Data in RRA column 2 | Search point |
|---|---|---|---|---|---|
| 0 | $A_1$ | $R_{00}, R_{10}, R_{20}, R_{30}$ | — | — | — |
| 1 | $A_2$ | $R_{01}, R_{11}, R_{21}, R_{31}$ | — | — | — |
| 2 | $A_3$ | $R_{02}, R_{12}, R_{22}, R_{32}$ | — | — | — |
| 3 | $A_4$ | $R_{03}, R_{13}, R_{23}, R_{33}$ | — | — | (−2, −2) |
| 4 | $B_1$ | $R_{04}, R_{14}, R_{24}, R_{34}$ | $R_{10}, R_{20}, R_{30}$ | — | (−2, −1) |
| 5 | $B_2$ | $R_{05}, R_{15}, R_{25}, R_{35}$ | $R_{11}, R_{21}, R_{31}$ | $R_{10}, R_{20}, R_{30}$ | (−2, 0) |
| 6 | C | $R_{42}, R_{43}, R_{44}, R_{45}$ | $R_{11}, R_{21}, R_{31}$ | $R_{10}, R_{20}, R_{30}$ | (−1, 0) |
| 7 | $D_1$ | $R_{41}$ | $R_{10}, R_{20}, R_{30}$ | $R_{25}, R_{35}, R_{45}$ | (−1, −1) |
| 8 | $D_2$ | $R_{40}$ | $R_{25}, R_{35}, R_{45}$ | $R_{24}, R_{34}, R_{44}$ | (−1, −2) |
| 9 | C | $R_{50}, R_{51}, R_{52}, R_{53}$ | $R_{25}, R_{35}, R_{45}$ | $R_{24}, R_{34}, R_{44}$ | (0, −2) |
| 10 | $D_1$ | $R_{54}$ | $R_{30}, R_{40}, R_{50}$ | $R_{25}, R_{35}, R_{45}$ | (0, −1) |
| 11 | $D_2$ | $R_{55}$ | $R_{31}, R_{41}, R_{51}$ | $R_{30}, R_{40}, R_{50}$ | (0, 0) |
| 12 | C | $R_{62}, R_{63}, R_{64}, R_{65}$ | $R_{31}, R_{41}, R_{51}$ | $R_{30}, R_{40}, R_{50}$ | (1, 0) |

(MVPs) based on the motion vectors of past blocks (e.g., those blocks that have been processed before the $ij^{th}$ block) can be obtained, at 1108.

In an aspect, one of the MVP is the median of MV_left, MV_top, and MV_topRight, where MV_left is the motion vector of the left block at (i, j−1), MV_top is the motion vector of the top block at (i−1, j) and MV_topRight is the motion vector of the top right block at (i−1, j+1).

At 1110, a search area centered around a MVP is defined in each of the reference frames. A motion estimation is performed, at 1112, for each of the possible sub-blocks in the block and the MVPs can be used in the motion estimation. At 1114, the most appropriate motion vectors of all possible sub-blocks in all reference frames and the overall most suitable motion vectors are found for each sub-block.

In accordance with some aspects, L=1 such that the L+1=2 chains of K inter-connected shift registers can be substantially the same. In other words, the ASRA contains only one chain of shift registers.

In some aspects, only one MVP is used. The single MVP (SVMP) is the median of MV_left, MV_top, and MV_topRight. In some aspects, a local full search motion estimation is performed around the SMVP. In some aspects, fast motion estimation is performed, which can utilize multiple MVPs With reference to the above table, after initialization cycles, the current pixels can be stored inside the PE array, and the reference pixels can be propagated into the PE array. Here, $R_{ij}$ is the $ij^{th}$ reference pixel in the search window. After calculating the SAD of the first search point, a new column of reference pixels can be loaded into the PE array, three reference pixels can be propagated into Column 1 of RRA, and the SAD of a new search point is also calculated in Step $B_1$. Step $B_2$ is similar to $B_1$, except that Column 1 of RRA is propagated to Column 2 and another three reference pixels can be propagated into Column 1 from the PE array. In step C, a new row of reference pixels is loaded into the PE array and the RRA is not changed. In step $D_1$ and $D_2$, rather than loading one row (or column) of pixels, only one reference pixel per clock cycle is loaded and data reuse is achieved by moving the data from RRA into the PE array.

As mentioned, in traditional H.264, a frame is divided into 16×16 macroblocks. Each macroblock is sub-divided into sub-blocks of size 16×16, 16×8, 8×16, 8×8, 4×8, 8×4, 4×4. Motion estimation is performed for each possible sub-block and a mode decision scheme calculates the rate-distortion (RD) cost function for all the sub-blocks and finds the most suitable sub-block. The RD-optimized sub-block motion estimation is one of the tools to help H.264 to achieve improved RD performance. The RD is a sum of two terms: (1) the distortion and (2) the product of a lambda parameter and the rate to encode the motion vector. The rate to encode the motion vector is a function of the difference between the motion vector and a motion vector predictor (MVP). The MVP is different for each sub-block size. The MVP is also different for sub-blocks of the same or a similar size but a different location. The lambda is a real number and uses floating point operations. The different MVP definitions for sub-blocks of same size, or a similar size, but at different locations, renders the traditional H.264 difficult to implement because data flow is not regular.

With the disclosed aspects, sub-block motion estimation is performed with an RD performance that is similar to H.264. The disclosed aspects include a full search with a reduced search area around a motion vector predictor, instead of the complete full search with a large search area. Also disclosed herein is a single (or unified) motion vector predictor, which is common (or substantially the same) for all sub-blocks of any size and at any location within the block. Also disclosed is a RD-similar cost function, which can approximate other RD cost functions.

Further, efficient motion estimation is desirable since it can affect system performance. Some motion estimation technique have significant redundant data loading (e.g., many reference pixels can be loaded more than one time) and/or irregular data flow such that pipelining is not efficient. Disclosed herein is a scanning order, referred to as Smart Snake (SS). With the disclosed scanning order, redundant data loading can be reduced or substantially eliminated. Further, the disclosed scanning order can also achieve different data re-use ratios, which can be used for the various requirements of end users. For example, in each search window, each reference pixel is loaded once and only once in SS.

In an example of H.264 variable blocksize RDO motion estimation, median motion vector prediction (MVP) is used in a rate-distortion cost function computation and can be a starting point for local full search or fast search. However, the definition of median MVP is different for different sub-block size and the motion vectors are not reused. Thus, in order to compute the MVP for all the sub-blocks within a current macro-block, all the motion vectors of all the sub-blocks of all sizes and at all locations of a row of past macro-blocks are stored in on-chip or off-chip memory and reloaded to generate all the median MVPs of the sub-blocks in the current blocks. This can result in increased on-chip memory size, a large amount of latency, and considerable power consumption.

As disclosed herein, provided is a reconfigurable multi-resolution motion vector re-use hardware architecture based on the single motion vector predictor (SMVP) and RD-similar cost function, which uses SMVP instead of the regular median MVP. Further, through utilization of the disclosed aspects, only a small number of past motion vectors are propagated and the aspects can be easily reconfigured for video with different spatial resolution.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It is also noted, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and dire Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the subject aspects. It is, of course, not possible to describe every conceivable combination of components or methods for purposes of describing the subject aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. Moreover, articles "a" and "an" as used in the subject specification and annexed drawings are generally to be construed to mean "one or more" unless specified otherwise or clear from context to be directed to a singular form.

What is claimed is:

1. A method, comprising:
   dividing, by a system comprising a processor, one or more video frames into a plurality of sub-blocks created from a plurality of macro-blocks;
   determining, by the system, a reference frame within the one or more video frames;
   defining, by the system, a search area for the plurality of sub-blocks as a function of a plurality of motion vector predictors comprising centering the search area around a location defined in the reference frame; and
   searching, by the system, within at least one sub-block of the plurality of sub-blocks for a single motion vector predictor for the plurality of sub-blocks, wherein the searching is based on determining a rate-distortion cost between search points within the plurality of sub-blocks, the searching comprising:
   using a first search pattern to search a first sub-block of the plurality of sub-blocks, wherein the search of the first sub-block comprises first stages of searching, and wherein the first stages of searching comprise one or more hierarchical stage of search;
   using a set of previously loaded data based on a first data re-use ratio to search the first sub-block, wherein the set of previously loaded data is stored at a shift register array of a set of inter-connected internal adaptive shift registers of the system, wherein each shift register of the set of internal adaptive shift registers is capable of storing a set of previously loaded data associated with a range of sub-block sizes; and
   using a second search pattern to search a second sub-block of the plurality of sub-blocks, wherein the first sub-block and the second sub-block are of different sizes and have different shapes, wherein the search of the second sub-block comprises second stages of searching wherein the second stages of searching comprises one or more hierarchical stage of search, wherein the second search pattern re-uses the set of previously loaded data based on a second data re-use ratio to search the second sub-block of the plurality of sub-blocks, and wherein the first data re-use ratio is different from the second data re-use ratio.

2. The method of claim 1, wherein the determining the rate-distortion cost comprises determining a cost that comprises a first additive element that is a distortion measure between a current sub-block and a candidate reference sub-block and determining a second additive element that is a product of lambda, being a function of at least one of a sub-block size and location, a macro-block location and type, a quantization parameter, a target rate behavior, a buffer condition or a buffer property, and a function of a difference between a candidate motion vector and a motion vector predictor.

3. The method of claim 2, wherein the determining the second additive element comprises determining the second additive element as a function of motion vectors of a set of neighboring macro-blocks or a set of neighboring sub-blocks corresponding to the first sub-block.

4. The method of claim 3, further comprising:
   determining, by the system, the plurality of motion vector predictors as a function of a plurality of motion vectors of the set of neighboring macro-blocks or the set of neighboring sub-blocks, and wherein the defining the search area comprises identifying a search center as a function of the plurality of motion vector predictors.

5. The method of claim 4, further comprising assigning, by the system, a motion vector predictor from the plurality of motion vector predictors as a median of a macro-block motion vector on a left macro-block, a top macro-block, and a top-right macro-block.

6. The method of claim 1, wherein the defining the search area comprises determining a search center as a median of motion vectors of three past neighboring macro-blocks that comprise a first macro-block at a left position, a second macro-block at a top position, and a third macro-block at a top-right position.

7. The method of claim 6, further comprising determining, by the system, at least one alternative macro-block in response to a determination of one of the first macro-block, the second macro-block, or the third macro-block being unavailable.

8. The method of claim 7, wherein the determining the at least one alternative macro-block comprises choosing a fourth macro-block at a top-left position.

9. A system, comprising:
a processor that executes or facilitates execution of computer executable components stored in a memory, the computer executable components comprising:
a partition component configured to divide a video frame into a plurality of macro-blocks;
a sub-partition component configured to divide the plurality of macro-blocks into a plurality of sub-blocks, wherein a first macro-block of the plurality of macro-blocks is divided into at least two sub-blocks, and wherein the first macro-block and the at least two sub-blocks are of different sizes and different shapes;
a selection component configured to choose a reference frame from the plurality of sub-blocks;
a data processing component configured to use a set of previously loaded data within a set of internal adaptive shift registers of the system based on a first data re-use ratio to search a first block of the at least two sub-blocks, wherein each shift register of the set of internal adaptive shift registers is capable of storing a respective set of previously loaded data associated with the reference frame and further configured to use the set of previously loaded data based on a second data re-use ratio to search a second block of the at least two sub-blocks, wherein the first data re-use ratio and the second data re-use ratio are different;
a classification component configured to define a search area comprising a set of search points, wherein the search area is based on a plurality of motion vector predictors, and wherein the search area is defined to capture different area sizes and area shapes; and
an evaluation component configured to calculate a rate-distortion cost function for selected search points of the set of search points in the search area based on the set of previously loaded data to choose a motion vector for the plurality of sub-blocks.

10. The system of claim 9, wherein the rate-distortion cost function comprises a first element and a second element, wherein the first element is a distortion measure and the second element is a product of a parameter and a function of a difference between a candidate motion vector and a motion vector predictor of the plurality of motion vectors.

11. The system of claim 10, wherein the parameter is lambda, which is a function of a sub-block size and location, a macro-block location and type, a quantization parameter, a target rate behavior, a buffer condition and a buffer property.

12. The system of claim 10, wherein the parameter is approximated by a linear combination of a power-of-2.

13. The system of claim 10, wherein the motion vector predictor of the second element is a function of motion vectors of past neighboring macro-blocks.

14. The system of claim 10, wherein the motion vector predictor of the second element is a function of motion vectors of past neighboring macro-blocks on a left, a top, and a top right in relation to a current macro-block.

15. The system of claim 14, wherein the motion vector predictor of the second element is a median of the motion vectors of past neighboring macro-blocks on the left, the top, and the top right in relation to a current macro-block.

16. The system of claim 10, wherein the search area corresponds to the candidate motion vector between a current macro-block or a current sub-block and a candidate reference macro-block or a candidate sub-block of a similar size in the reference frame.

17. The system of claim 9, wherein the search area comprises a search center that is the motion vector predictor.

18. The system of claim 17, wherein the search center is a median of identified motion vectors of three past neighboring macro-blocks.

19. The system of claim 18, wherein the three past neighboring macro-blocks comprise a left macro-block, a top macro-block, and a top-right macro-block in relation to a current macro-block.

20. A method, comprising:
determining, by a system comprising a processor, a reference frame from a plurality of video frames;
defining, by the system, a search area comprising a plurality of search points in the reference frame, wherein the search area is defined to capture different area sizes and area shapes;
dividing, by the system, the search area into sub-windows comprising a first sub-window of a first size and a first shape, and a second sub-window of a second size and a second shape different from the first size and the first shape;
using, by the system, a set of previously loaded data based on a first data re-use ratio to search the sub-windows, wherein the set of previously loaded data is stored within a set of inter-connected internal adaptive shift registers of the system; and
processing, by the system, the plurality of video frames comprising determining a scanning order among the sub-windows and the sub-windows are scanned at least once and two adjacent sub-windows are adjacent each other, wherein the processing comprises using a first scanning order for the first sub-window and using a second scanning order for the second sub-window, the second scanning order being different from the first scanning order; and
using, by the system, the set of previously loaded data based on a second data re-use ratio to search the second sub-window, wherein the first data re-use ratio and the second data re-use ratio are different.

21. The method of claim 20, further comprising scanning, by the system, the sub-windows, and wherein the scanning comprises performing a horizontal scan, a vertical scan, or both the horizontal scan and the vertical scan.

22. The method of claim 20, further comprising before the defining, dividing, by the system, the video frames into blocks that comprise N×N pixels, and wherein the processing further comprises reading N pixels in parallel in one clock cycle and loading the pixels once within the sub-window.

23. The method of claim 21, wherein the scanning of the sub-windows comprises scanning with at least one snake scan chosen from sixteen different snake scans.

24. The method of claim 21, wherein the scanning of the sub-windows further comprises:
scanning a first sub-window with a first type of snake scan;
moving to an adjacent search point in a second sub-window; and
scanning the second sub-window with a second type of snake scan.

25. The method of claim 20, wherein the dividing the search area into sub-windows further comprises dividing the search area into non-overlapping rectangular sub-windows.

26. The method of claim 21, wherein the scanning of the sub-windows comprises defining a scanning order using a scan that starts from an upper-left corner, an upper-right corner, a lower-left corner, or a lower-right corner of a search window, and wherein the scan is a horizontal scan or a vertical scan.

27. The method of claim 21, wherein the scanning of the sub-windows comprises dividing the search area into regions and applying a snake scan locally in the regions.

28. A system, comprising:
a processor that executes or facilitates execution of computer executable components stored in a memory, the computer executable components comprising:
a selection component configured to identify a reference frame from a set of references based on a first motion vector predictor and a second motion vector predictor of the reference frame;
a designation component configured to define a search area in the reference frame, wherein the search area is configured to capture different area sizes and area shapes;
a sub-partition component configured to divide the search area into a plurality of sub-windows, wherein at least two sub-windows of the plurality of sub-windows comprise different sizes and different shapes, and wherein the reference frame and the at least two sub-windows comprise different sizes and different shapes;
a control unit component that uses a set of previously loaded data corresponding to at least a portion of the reference frame and stored within a set of internal adaptive shift registers of the system to search the at least two windows, wherein each shift register of the set of internal adaptive shift registers stores a subset of the set of previously loaded data; and
a scan component configured to scan the plurality of sub-windows based on a selected scanning order and two adjacent sub-windows in the selected scanning order are spatially close, wherein the selected scanning order for each of the at least two sub-windows is selected based in part on a respective size and a respective shape of the at least two sub-windows, wherein the scan component is configured to perform both a horizontal scan and a vertical scan on the plurality of sub-windows, wherein the set of previously loaded data is used to facilitate the horizontal scan and the vertical scan of the plurality of sub-windows, wherein the set of previously loaded data is used to scan a first sub-window of the two-adjacent sub-windows based on a first data re-use ratio, wherein the set of previously loaded data is re-used to scan a second-sub-window of the two-adjacent sub-windows based on a second data re-use ratio, and wherein the first data re-use ratio is different from the second data re-use ratio.

29. The system of claim 28, wherein the scan component is configured to perform the horizontal scan in which a first row is scanned horizontally in a first direction and a second row is scanned horizontally in a second direction.

30. The system of claim 28, wherein the scan component is configured to perform the vertical scan in which a first row is scanned vertically in a first direction and a second row is scanned vertically in a second direction.

31. The system of claim 28, wherein the scan component is configured to select a scanning order that comprises a snake scan that starts in a upper-left corner, an upper-right corner, a lower-left corner, or a lower-right corner of the search area, wherein the snake scan uses the horizontal scan or the vertical scan.

32. The system of claim 28, wherein a plurality of points in the search area correspond to a candidate motion vector between a current block and a candidate reference block of a similar size in the reference frame.

33. The system of claim 28, wherein the sub-partition component is configured to divide the search area into rectangular sub-windows, and wherein a plurality of search points in the search area belong to the plurality of sub-windows.

34. The system of claim 28, further comprising:
a data bus configured to read N pixels in parallel in one clock cycle, wherein a block of the reference frame comprises N×N pixels; and
a reconfigurable register array configured to store data in a row for use in a next row, wherein the N pixels are loaded once within the plurality of sub-windows.

35. The system of claim 28, wherein the scan component is configured to select a scanning order from sixteen different snake scans, wherein a first set of the snake scans are for the vertical scan and a second set of the snake scans are for the horizontal scan.

36. The system of claim 28, wherein the scan component is configured to select a scanning order that divides the search area into regions and a snake scan is applied locally in the regions.

37. A method, comprising;
determining, by a system comprising a processor, a plurality of reference frames from a set of video frames;
obtaining, by the system, from the plurality of reference frames, a first motion vector predictor and a second motion vector predictor;
defining, by the system, a search area in the plurality of reference frames, the search area is centered around the first motion vector predictor or the second motion vector predictor wherein the search area is configurable to capture different sizes and shapes, wherein the search area and each reference frame of the plurality of reference frames comprise different sizes and shapes;
using, by the system, a set of previously loaded data corresponding to the plurality of reference frames within a set of internal adaptive shift registers of the system, wherein each shift register of the set of internal adaptive shift registers stores a subset of the set of previously loaded data that corresponds to a reference frame of the plurality of reference frames within a respective shift register of the set of internal adaptive shift registers;
performing, by the system, motion estimation for sub-blocks based on the first motion vector predictor and the second motion vector predictor, wherein the sub-blocks comprise a first sub-block comprising a first size and a first shape and at least a second sub-block comprising a second size and a second shape different from the first size and the first shape wherein the first sub-block and the second sub-block are divisions of a same block, and wherein the performing motion estimation comprises:

performing a first motion estimation scan for the first sub-block, performing a second motion estimation scan, different from the first motion estimation scan, for at least the second sub-block, wherein the first motion estimation scan and the second motion estimation scan uses the set of previously loaded data to increase a scan speed associated with each respective scan, wherein a first use of the set of previously loaded data for the first motion estimation scan is based on a first data re-use ratio, and wherein a second use of the set of previously loaded data for the second motion estimation scan is based on a second data re-use ratio; and selecting a motion vector from the sub-blocks in the plurality of reference frames.

38. The method of claim 37, wherein the obtaining comprises obtaining the first motion vector predictor and the second motion vector predictor based on motion vectors of past blocks.

39. The method of claim 37, wherein the obtaining the first motion vector predictor or the obtaining the second motion vector predictor comprises obtaining a first median of a first motion vector of a left block, a second median of a second motion vector of a top block, or a third median of a third motion vector of a top-right block in relation to a current block.

40. The method of claim 37, wherein the performing the first motion estimation or the second motion estimation comprises performing a single motion vector predictor that uses only one of the first motion vector predictor or the second motion vector predictor.

41. The method of claim 40, further comprising performing, by the system, a location full search motion estimation around the first motion vector predictor or the second motion vector predictor.

42. The method of claim 37, wherein the performing the motion estimation for the sub-blocks further comprises computing a cost function that comprises multiple additive terms comprising a distortion term and a term that is a product of a lambda parameter, wherein the lambda parameter is a function of at least one of a sub-block size and location, a block location and type, a quantization parameter, a target rate behavior, a buffer condition or a buffer property, and a rate function of encoding the motion vector.

43. The system of claim 9, further comprising a scan component configured to select a scanning order among the plurality of sub-blocks and is further configured to perform both a horizontal scan and a vertical scan on the plurality of sub-blocks.

44. The method of claim 1, wherein a different first search pattern corresponds to each respective stage of searching of the one or more hierarchical stage of search.

45. The method of claim 1, wherein a different second search pattern corresponds to each respective stage of searching of the one or more hierarchical stage of search.

* * * * *